United States Patent
Goryunov et al.

(10) Patent No.: US 11,560,394 B2
(45) Date of Patent: Jan. 24, 2023

(54) METAL COMPLEX COMPRISING AMIDINE AND INDOLE FUSED CYCLOPENTADIENYL LIGANDS

(71) Applicant: ARLANXEO NETHERLANDS B.V., Geleen (NL)

(72) Inventors: Georgy Pavlovich Goryunov, Moscow (RU); Oleg Vladimirovich Samsonov, Moscow (RU); Dmitry Vadimovich Uborsky, Moscow (RU); Alexander Zel'Manovich Voskoboynikov, Moscow (RU); Alexandra Berthoud, Neerharen (DE); Maxence Valla, Liege (BE)

(73) Assignee: Arlanxeo Netherlands B.V.

( * ) Notice: Subject to any disclaimer, the term of this patent is extended or adjusted under 35 U.S.C. 154(b) by 34 days.

(21) Appl. No.: 17/048,042

(22) PCT Filed: Apr. 15, 2019

(86) PCT No.: PCT/EP2019/059634
§ 371 (c)(1),
(2) Date: Oct. 15, 2020

(87) PCT Pub. No.: WO2019/201838
PCT Pub. Date: Oct. 24, 2019

(65) Prior Publication Data
US 2021/0269465 A1    Sep. 2, 2021

(30) Foreign Application Priority Data

Apr. 16, 2018  (WO) .................. PCT/RU2018/00237

(51) Int. Cl.
*C07F 17/00*     (2006.01)
*C08F 4/6592*   (2006.01)
*C08F 210/16*   (2006.01)
*C08F 210/18*   (2006.01)
*C07F 7/28*       (2006.01)

(52) U.S. Cl.
CPC ............... *C07F 7/28* (2013.01); *C07F 17/00* (2013.01); *C08F 210/16* (2013.01); *C08F 210/18* (2013.01)

(58) Field of Classification Search
CPC ...... C07F 17/00; C07F 4/6592; C07F 210/16; C07F 210/18
See application file for complete search history.

(56) References Cited

U.S. PATENT DOCUMENTS 6,451,724 B1   9/2002  Nifant'ev et al.
9,546,233 B2   1/2017  Scott et al.

FOREIGN PATENT DOCUMENTS

| CN | 106543302 A    | 3/2017  |
|----|----------------|---------|
| EP | 2801579 A1     | 11/2014 |
| JP | 2008075043 A   | 4/2008  |
| KR | 20170046462 A  | 5/2017  |
| WO | 1999/024446 A1 | 5/1999  |
| WO | 2019/201838 A1 | 10/2019 |
| WO | 2019/203676 A1 | 10/2019 |

OTHER PUBLICATIONS

Chen, Eugene You-Xian et al., Cocatalysts for Metal-Catalyzed Olefin Polymerization: Activators, Activation Processes, and Structure-Activity Relationships, Chem. Rev, 2000, 100, pp. 1391-1434.
International Search Report & Written Opinion for International Application PCT No. PCT/EP2019/059634 dated Jun. 4, 2019.
International Search Report & Written Opinion for International Application PCT No. PCT/RU2018/000237 dated Dec. 11, 2018.

*Primary Examiner* — Caixia Lu
(74) *Attorney, Agent, or Firm* — Dentons Cohen & Grigsby P.C.

(57) ABSTRACT

A metal complex of the formula (1) InCyLMZp (1), wherein M is a group 4 metal, Z is an anionic ligand, p is number of 1 to 2, InCy is an indole fused cyclopentadienyl-type ligand of the formula (2) wherein $R^1$ independently is a C1-C4-alkyl, m is a number of 0 to 4, $R^2$ is a C1-C10-alkyl, C5-C10-cycloalkyl, or a C6-C10-aryl unsubstituted or substituted with C1-C10-alkyl or C1-C4-dialkyl amino, $R^3$, $R^4$ and $R^5$ each is independently selected from hydrogen, C1-C4-alkyl, C6-C10-aryl unsubstituted or substituted with C1-C4-alkyl, halide, or both of C1-C4-alkyl and halide and, L is an amidinate ligand of the formula (3a) wherein the amidine-containing ligand (3a) is bonded to the metal M via the imine nitrogen atom N2, wherein $R^7$ is independently selected from C1-C4-alkyl and halide and q is a number of 0 to 4, $Sub_4$ is a cyclic or linear aliphatic or aromatic substituent.

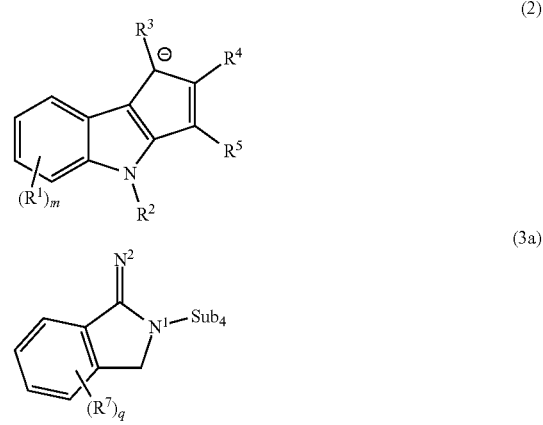

12 Claims, No Drawings

METAL COMPLEX COMPRISING AMIDINE AND INDOLE FUSED CYCLOPENTADIENYL LIGANDS

This application is a national phase application of International Application No. PCT/EP2019/059634, filed Apr. 15, 2019, which claims the benefit of International Application No. PCT/RU2018/000237 filed Apr. 16, 2018, having the title METAL COMPLEX COMPRISING AMIDINE AND INDOLE FUSED CYCLOPENTADIENYL LIGANDS, the disclosure of each of which is incorporated herein by reference in its entirety.

The present invention relates to a metal complex comprising certain indole fused cyclopentadienyl and amidine ligands, a catalyst system containing said metal complex and a process for manufacturing polymers wherein said metal complex or catalyst system is used.

A process for the polymerization of at least one olefin having 2 to 8 carbon atoms in the presence of a polymerization catalyst component comprising a benzothiophene fused cyclopentadienyl and an amidine ligand, is known from KR20170046462.

Surprisingly and advantageously it is observed that catalyst components with a certain indole fused cyclopentadienyl and amidine ligands produce higher molecular weight polymers compared to catalysts similar to those shown in the KR20170046462 and are highly productive.

A purpose of the invention is to provide new catalyst components that provide a higher molecular weight capability than certain thiophene catalysts.

DETAILS OF THE INVENTION

This objective is achieved with a metal complex of the formula (1)

$$InCyLMZ_p \quad (1),$$

wherein
M is a group 4 metal
Z is an anionic ligand,
p is number of 1 to 2, preferably 2,
InCy is an indole fused cyclopentadienyl-type ligand of the formula (2)

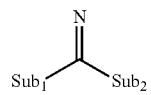

(2)

wherein
$R^1$ means for each index m individually a $C_1$-$C_4$-alkyl that substitutes a hydrogen atom of the benzene ring,
m is a number of 0 to 4, preferably 0 to 2, in particular 0,
$R^2$ means $C_1$-$C_{10}$-alkyl, $C_5$-$C_{10}$-cycloalkyl, and an unsubstituted or $C_1$-$C_{10}$-alkyl or $C_1$-$C_4$-dialkyl amino substituted $C_6$-$C_{10}$-aryl, in particular $C_1$-$C_4$-alkyl substituted phenyl, more preferably methyl, phenyl or di-$C_1$-$C_4$-alkyl substituted phenyl, in particular di-tert.-butyl-phenyl,
$R^3$, $R^4$ and $R^5$ being individually selected from the group of hydrogen, $C_1$-$C_4$-alkyl, unsubstituted or $C_1$-$C_4$-alkyl and/or halogen, in particular chlorine or fluorine substituted $C_6$-$C_{10}$-aryl, in particular unsubstituted or $C_1$-$C_4$-alkyl substituted phenyl, whereby preferably $R^3$, $R^4$ and $R^5$ being individually selected from the group of hydrogen, $C_1$-$C_4$-alkyl, unsubstituted or $C_1$-$C_4$-alkyl and/or halogen, in particular chlorine or fluorine substituted $C_6$-$C_{10}$-aryl, in particular $C_1$-$C_4$-alkyl substituted phenyl, more preferably at least one of the radicals $R^3$ to $R^5$ shall mean $C_1$-$C_4$-alkyl, in particular methyl, i-propyl and phenyl and,
L is an amidinate ligand of the formula (3)

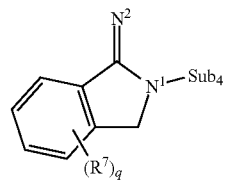

(3)

wherein the amidine-containing ligand is covalently bonded to the metal M via the imine nitrogen atom, and
$Sub_1$ is an unsubstituted or $C_1$-$C_4$-alkyl and/or halogen, in particular chlorine and/or fluorine substituted $C_6$-$C_{10}$-aromatic substituent, in particular phenyl and
$Sub_2$ is a substituent comprising a heteroatom of group 15, through which $Sub_2$ is bonded to the imine carbon atom or
$Sub_1$ and $Sub_2$ together with the imino group they are connected to form a ligand of formula (3a)

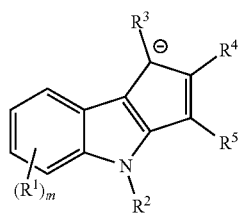

(3a)

wherein the amidine-containing ligand (3a) is covalently bonded to the metal M via the imine nitrogen atom $N^2$,
wherein the benzo ring fused to the amidine ring may be unsubstituted or contain further substituents $R^7$, which are individually of the index "q" selected from the group of $C_1$-$C_4$-alkyl and halogen and whereby q is a number of 0 to 4, preferably 0 to 2, most preferably 0,
$Sub_4$ is an aliphatic or aromatic cyclic or linear substituent comprising a group 14 atom through which $Sub_4$ is bonded to the amino nitrogen atom $N^1$, preferably $Sub_4$ is a $C_6$-$C_{10}$-aromatic ring, preferably phenyl which is unsubstituted or substituted by one or more substituents from the group selected from halogen, in particular Cl or F and $C_1$-$C_4$-alkyl, preferably Sub4 is a 2,6-di-fluorophenyl.

In particular metal complex according to the present invention are preferred, wherein $Sub_1$ being a phenyl or $C_1$-$C_4$-alkyl and/or chlorine and/or fluorine substituted phenyl residue, in particular $Sub_1$ being a phenyl or substituted chlorine and/or fluorine substituted phenyl residue, preferably 2,6-dimethyl phenyl, 2,6-dichlorophenyl or 2,6-difluorophenyl.

In particular L is an amidinate ligand of the formula (3b)

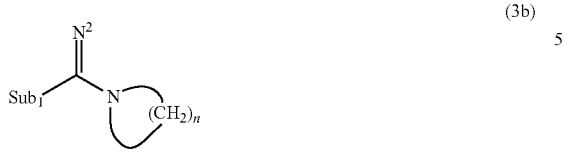

(3b)

wherein n means a number of 4 to 6, in particular n=5 and wherein the amidine-containing ligand (3b) is covalently bonded to the metal M via the imine nitrogen atom $N^2$ and Sub1 has the above mentioned meaning, in particular a fluorine substituted phenyl.

Complexes of the formula (1) wherein in formula (2)
m is 0 and
$R^2$ means $C_1$-$C_4$-alkyl, unsubstituted or $C_1$-$C_4$-alkyl substituted phenyl, more preferably methyl, phenyl or di-$C_1$-$C_4$-alkyl substituted phenyl, in particular di-tert.-butyl-phenyl are preferred.

M

In a preferred embodiment the metal M of group 4 is titanium (Ti), zirconium (Zr) or hafnium (Hf), most preferably titanium.

InCy

As used herein, the term cyclopentadienyl-type ligand is meant to broadly convey its conventional meaning, namely a substituted ligand having a five-membered carbon ring which is bonded to the metal via a π-type bonding usually in adopting $\eta^5$-coordination to the metal.

Preferably the substituents $R^3$, $R^4$ and $R^5$ of the InCy ligand shall individually have the following meaning, hydrogen, $C_1$-$C_4$-alkyl, in particular methyl and isopropyl, phenyl, fluorophenyl, in particular 2,6-di-fluorophenyl and halogen. In one preferred embodiment $R^3$ to $R^5$ shall all individually be selected from a group consisting of hydrogen, methyl, isopropyl and phenyl.

Z

In a preferred embodiment Z independently means a halogen atom, a $C_{1-10}$ alkyl group, a $C_{7-20}$ aralkyl group, a $C_{6-20}$ aryl group or a $C_{1-20}$ hydrocarbon-substituted amino group, a $C_{1-20}$ alkoxy group and more preferably, a halogen atom and a $C_{1-10}$ alkyl group, a $C_{7-20}$ aralkyl group, most preferably Cl, methyl, benzyl, methyltrimethylsilyl. Most preferred are Cl or methyl. In case p is more than 1, means p=2, the given meanings for Z are independent. Preferably p=2 and both Z are identical.

L

Typical examples for such a preferred amidinate-containing ligand are represented by formula (3), in particular (3b), preferably with n=5, with $Sub_1$ being a phenyl or substituted phenyl residue, in particular chlorine and/or fluorine substituted phenyl, preferably 2,6-dimethyl phenyl, 2,6-dichlorophenyl or 2,6-difluorophenyl.

Another preferred embodiment of the present invention relates to a metal complex of the formula (1) having an L of the formula (2), wherein $Sub_2$ is of the general formula —$NR^8R^9$ with $R^8$ and $R^9$ being individually selected from the group of aliphatic hydrocarbyl, halogenated aliphatic hydrocarbyl, aromatic hydrocarbyl and halogenated aromatic hydrocarbonyl residues. $R^8$ optionally forming a heterocyclic structure with $R^9$ or $Sub_1$. Examples for $Sub_2$ are dimethylamide, diisopropylamide and biscyclohexyl amide.

Most preferred examples of the amidinate-containing ligand represented by the formula (3) are based on protio-amidines of the formula (3H)

(3H)

Examples include N,N-dimethylacetimidamide, N,N-diisopropylacetimidamide, N,N-dicyclohexylacetimidamide, N-(2,6-dimethylphenyl)-N-ethylacetimidamide, N,N-dimethylisobutyrimidamide, N,N-diisopropylisobutyrimidamide, N,N-dicyclohexyliso-butyrimidamide, N-(2,6-dimethylphenyl)-N-ethylisobutyrimidamide, N,N-dimethylcyclohexanecarboximidamide, N,N-diisopropylcyclohexanecarboximidamide, N,N-dicyclohexylcyclohexanecarboximidamide, N-(2,6-dimethylphenyl)-N-ethylcyclohexane-carboximidamide, N,N-dimethylpivalimidamide, N,N-diisopropylpivalimidamide, N,N-dicyclohexylpivalimidamide, N-(2,6-dimethylphenyl)-N-ethylpivalimidamide, 2,2,2-trifluoro-N,N-dimethylacetimidamide, 2,2,2-trifluoro-N,N-diisopropylacetimidamide, N,N-dicyclohexyl-2,2,2-trifluoroacetimidamide, N-(2,6-dimethylphenyl)-N-ethyl-2,2,2-trifluoro-acetimidamide, 2-(phenyl)-N,N-dimethylacetimidamide, 2-(phenyl)-N,N-diisopropylacetimidamide, N,N-dicyclohexyl-2-(phenyl)acetimidamide, 2-(phenyl)-N-(2,6-dimethylphenyl)-N-ethylacetimidamide, 2-(2,6-dimethylphenyl)-N,N-dimethylacetimidamide, 2-(2,6-dimethylphenyl)-N,N-diisopropylacetimidamide, N,N-dicyclohexyl-2-(2,6-dimethylphenyl)acetimidamide, N,2-bis(2,6-dimethylphenyl)-N-ethylacetimidamide, 2-(2,6-difluorophenyl)-N,N-dimethylacetimidamide, 2-(2,6-difluorophenyl)-N,N-diisopropylacetimidamide, N,N-dicyclohexyl-2-(2,6-difluorophenyl)acetimidamide, 2-(2,6-difluorophenyl)-N-(2,6-dimethylphenyl)-N-ethyl-acetimidamide, N,N-dimethylbenzimidamide, N,N-diisopropylbenzimidamide, N,N-dicyclohexylbenzimidamide, N-(2,6-dimethylphenyl)-N-ethylbenzimidamide, N,N-dimethyl-1-naphthimidamide, N,N-diisopropyl-1-naphthimidamide, N,N-dicyclohexyl-1-naphthimidamide, N-(2,6-dimethyl-phenyl)-N-ethyl-1-naphthimidamide, N,N,2,6-tetra-methylbenzimidamide, N,N-diiso-propyl-2,6-dimethylbenzimidamide, N,N-dicyclohexyl-2,6-dimethylbenzimidamide, N-(2,6-dimethylphenyl)-N-ethyl-2,6-dimethylbenz-imidamide, 2,6-difluoro-N,N-dimethylbenzimidamide, 2,6-difluoro-N,N-diisopropylbenzimidamide, N,N-dicyclohexyl-2,6-difluorobenzimidamide, N-(2,6-dimethylphenyl)-N-ethyl-2,6-difluorobenzimidamide, 2,6-dichloro-N,N-dimethylbenzimidamide, 2,6-dichloro-N,N-diisopropylbenzimidamide, 2,6-dichloro-N,N-dicyclohexylbenzimidamide, 2,6-dichloro-N-(2,6-dimethylphenyl)-N-ethylbenzimidamide. Preferred examples are 2,6-difluoro-N,N-piperidinylbenzamidine, 2,4-difluoro-N,N-diisopropylbenz-imidamide (2,4-difluoro-N,N-diisopropylbenzamidine), 2,4,6-trifluoro-N,N-diisopropylbenz-imidamide (2,4,6-trifluoro-N,N-diisopropylbenzamidine), 3,5-difluoro-N,N-diisopropylbenz-imidamide (3,5-difluoro-N,N-diisopropylbenzamidine), pentafluoro-N,N-diisopropylbenz-imidamide (pentafluoro-N,N-diisopropylbenzamidine), 2,6-difluoro-N,N-diisopropylbenz-imidamide (2,6-difluoro-N,N-diisopropylbenzamidine) N,N- diisopropylbenzimidamide (N,N-diisopropylbenzamidine, 2-(2,6-difluorophenyl)isoindolin-1-imine,2-(2,6-dimethylphenyl)isoindolin-1-imine, 2-(2,6-diisopropylphenyl)isoindolin-1-imine, 2-(2,4,6-trimethylphenyl)isoindolin-1-imine, 2-(phenyl)isoindolin-1-imine, 2-(tertbutyl)isoindolin-1-imine, 2-(cyclopentyl)isoindolin-1-imine, 2-(cyclohexyl)isoindolin-1-imine, 2-(cycloheptyl)isoindolin-1-imine, 2-(cyclooctyl)isoindolin-1-imine, 2-(cyclododecyl)isoindolin-1-imine, 2-(adamantyl)isoindolin-1-imine, 2-cyclooctyl-7-fluoroisoindolin-1-imine, 2-allylisoindolin-1-imine, (E)-2-(But-2-en-1yl)isoindolin-1-imine, 2-(pentafluorophenyl)isoindolin-1-imine, 2-(2,6-diethylphenyl)isoindolin-1-imine, 2-(4,6-ditertbutylphenyl)isoindolin-1-imine, 2-(2-terbutylphenyl)isoindolin-1-imine.

Another preferred embodiment of the present invention relates to a metal complex of the formula (1) having a ligand L of the formula (3a)

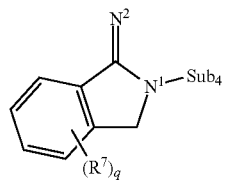

(3a)

wherein the amidine-containing ligand (3a) is covalently bonded to the metal M via the imine nitrogen atom $N^2$, wherein the benzo ring fused to the amidine ring may be unsubstituted or contain further substituents $R^7$, which are individually of the index "q" selected from the group of $C_1$-$C_4$-alkyl and halogen, particular fluorine and whereby q is a number of 0 to 4, preferably 0 to 2, most preferably 0 and Sub$_4$ is an aliphatic or aromatic cyclic or linear substituent comprising a group 14 atom through which Sub$_4$ is bonded to the amino nitrogen atom $N^1$, preferably Sub$_4$ is a $C_6$-$C_{10}$ aromatic ring, preferably phenyl which is unsubstituted or substituted by one or more substituents from the group selected from halogen, in particular Cl or F and $C_1$-$C_4$-alkyl, in particular methyl, preferably Sub4 is 2,6-difluorophenyl or 2,6-dimethylphenyl.

Preferred is a metal complex of formula (1), wherein
M is Ti,
Z is selected from the group consisting of chlorine, $C_1$-$C_4$-alkyl and $C_{7-20}$ aralkyl, in particular benzyl, preferably Z means methyl or chlorine and
p is 2
InCy is a ligand of the formula (2) wherein m=0 and $R_2$ means methyl, phenyl, or $C_1$-$C_4$-alkyl substituted phenyl, in particular di-tert.-butylphenyl,
$R^3$, $R^4$ and $R^5$ are independently of another hydrogen, methyl, phenyl, fluorophenyl, i-propylphenyl.
Process The invention further relates to a process for the manufacturing of a metal complex of formula (1), wherein a metal complex of the formula (4)

is reacted with an amidine of the formula LH of the formula (3H) or its hydrohalogen acid salt LH.HX wherein L has the meaning according to at least one of claims 1 to 6 and X means halogen, in particular Cl.

Precursors of the formula (4) are known and can be prepared by organic/organometallic reactions. Specific examples are shown in this report (vide infra).

The reaction with LH or its hydrohalogen acid salt LH.HX is preferably carried out in a suitable solvent and preferably in the presence of suitable base.

Suitable bases include organic bases, inorganic bases, and organometallics. Typical examples for suitable bases are triethylamine and methylmagnesium bromide/chloride.

A suitable solvent is preferably an aromatic or aliphatic hydrocarbon solvent. The reaction is preferably carried out at ambient pressure, preferably at 0.9 bar to 1.1 bar, and a temperature in the range of 0 to 90° C. More preferably, in the range 20 to 60° C.

The molar ratio of LH or LH.HX to InCyMZ$_{p+1}$ is preferably in the range of 0.8 to 1.5, most preferably the ratio is 0.95 to 1.05. The molar ratio of suitable base to LH, LH.HX is preferably in the range of 1 to 5, more preferably the ratio is 2 to 4.

The metal complex of formula (1) wherein Z means a halogen atom may be isolated using techniques well known to those skilled in the art by filtration, to remove any inorganic or organic salt byproducts, followed by removal of volatiles under reduced pressure or by crystallization with subsequent removal of the mother liquor by filtration or by decantation. Optionally the crude mixture may be employed in polymerization reactions without further work-up or purification steps.

Techniques well-known to those skilled in the art are used to obtain further a metal complex of the formula 1 wherein Z means a C1-10 alkyl group, a C7-20 aralkyl group, a C6-20 aryl group from the metal complex of formula (1) wherein Z means a halogen atom by using suitable hydrocarbylating reagents for the salt metathesis reaction preferably in a suitable solvent. Preferably, Grignard reagents or organolithium reagents are employed as alkylating agents. The molar ratio of hydrocarbylating agent, in particular the alkylating agent to the metal complex of formula (1) is preferably in the range of 1.8 to 5.0, more preferably in the range 2.0-2.5. The alkylating agent is preferably methyl magnesium chloride, methyl lithium, benzyl magnesium chloride or benzyl magnesium bromide. This may be carried out at ambient pressure, preferably at 0.9 bar to 1.1 bar and a temperature in the range of 0 to 90° C. Preferably in the range −30° C. to 30° C.

Alternatively, a metal complex of the formula (1) wherein Z means a C-M0 alkyl group, a $C_{7-20}$ aralkyl group or a $C_{6-20}$ aryl group may be prepared by combining LH or LH.HX with InCyMZ$_{p+1}$ wherein Z means a C1-10 alkyl group, a C7-20 aralkyl group or a C6-aryl group and A, p and n have the above mentioned meaning in a suitable solvent. Suitable solvents preferably are aromatic or aliphatic hydrocarbon solvents. This may be carried out at ambient pressure, preferably at 0.9 bar to 1.1 bar, preferably at temperatures in the range of 0 to 120° C. More preferably in the range 70 to 110° C.

The invention further provides a catalyst system comprising
a) a metal complex of the formula (1) according to the present invention and
b) an activator and
c) optionally a scavenger.

The preferred metal complex of compound a) is mentioned above. A scavenger c) is a compound that reacts with impurities present in the process of the invention, which are poisonous to the catalyst.

In a preferred embodiment of the present invention the scavenger c) as of the catalyst system is a hydrocarbyl of a metal or metalloid of group 1-13 or its reaction products with at least one sterically hindered compound containing a group 15 or 16 atom.

Preferably, the group 15 or 16 atom of the sterically hindered compound bears a proton. Examples of these sterically hindered compounds are tert-butanol, iso-propanol, triphenylcarbinol, 2,6-di-tert-butylphenol, 4-methyl-2,6-di-tert-butylphenol, 4-ethyl-2,6-di-tert-butylphenol, 2,6-di-tert-butylanilin, 4-methyl-2,6-di-tert-butylanilin, 4-ethyl-2,6-di-tert-butylanilin, HMDS (hexamethyldisilazane), diisopropylamine, di-tert-butylamine, diphenylamine and the like. Some non-limiting examples of scavengers are organoaluminium compounds (E), butyllithium including its isomers, dihydrocarbylmagnesium, and hydrocarbylzinc and their reaction products with a sterically hindered compound or an acid, such as HF, HCl, HBr, HI. Furthermore organoaluminium compounds (E) as defined below can be used as activator b), in particular hydrocarbylaluminoxanes like methylaluminoxane (MAO).

Activators of the component b) for single-site catalysts are fairly well known in the art. These activators often comprise a group 13 atom, such as boron or aluminium. Examples of these activators are described in Chem. Rev., 2000, 100, 1391 by E. Y-X. Chen and T. J. Marks. A preferred activator b) is a borane (C1), a borate (C2, C3) or an organoaluminum compound (E) like alkylaluminoxane such as methyl aluminoxane (MAO). The activator for activation preferably is any boron compound of the following (C1) to (C3) and/or an organoaluminum compound (E). The organoaluminum compound (E) may be employed as a scavenger and/or an activator.

(C1) A boron compound represented by the general formula $BQ_1Q_2Q_3$
(C2) A boron compound represented by the general formula $G(BQ_1Q_2Q_3Q_4)$
(C3) A boron compound represented by the general formula $(J-H)(BQ_1Q_2Q_3Q_4)$ $Q_1$ to $Q_3$ are a halogen atom, hydrocarbon group, halogenated hydrocarbon group, substituted silyl group, alkoxy group or di-substituted amino group, and they may be the same or different. $Q_4$ to $Q_3$ are preferably a halogen atom, hydrocarbon group having 1 to 20 carbon atoms, halogenated hydrocarbon group having 1 to 20 carbon atoms, substituted silyl group having 1 to 20 carbon atoms, alkoxy group having 1 to 20 carbon atoms or amino group having 2 to 20 carbon atoms, and more preferably, $Q_4$ to $Q_3$ are a halogen atom, hydrocarbon group having 1 to 20 carbon atoms, or halogenated hydrocarbon group having 1 to 20 carbon atoms. Further preferably, $Q_1$ to $Q_3$ are a fluorinated hydrocarbon group having 1 to 20 carbon atoms containing at least one fluorine atom, and particularly preferably, to $Q_3$ are a fluorinated aryl group having 6 to 20 carbon atoms containing at least one fluorine atom. $Q_4$ has the same meaning as one of the radicals $Q_1$ to $Q_3$ and $Q_1$ to $Q_4$ may be the same or different. G is an inorganic or organic cation, J is a neutral Lewis base, and (J-H) is a Bronsted acid.

In the boron compound (C1) represented by the general formula $BQ_1Q_2Q_3$, B is a boron atom in the trivalent valence state, $Q_1$ to $Q_3$ have the above mentioned meanings and may be the same or different.

Specific examples of the compound (C1) include tris(pentafluorophenyl)borane, tris(2,3,5,6-tetrafluorophenyl) borane, tris(2,3,4,5-tetrafluorophenyl)borane, tris(3,4,5-trifluorophenyl)borane, tris(2,3,4-trifluorophenyl)borane, phenyl-bis(pentafluoro-phenyl)-borane and the like, and tris (pentafluorophenyl)borane is most preferable.

In the boron compound (C2) represented by the general formula $G(BQ_1Q_2Q_3Q_4)$, $G^+$ is an inorganic or organic cation, B is a boron atom in the trivalent valence state, and $Q_1$ to $Q_4$ are as defined for $Q_4$ to $Q_3$ in the above-mentioned (C1).

Specific examples of the inorganic cation G in a compound represented by the general formula $G(BQ_1Q_2Q_3Q_4)$ include a ferrocenium cation, alkyl-substituted ferrocenium cation, silver cation and the like, specific examples of the organic cation G thereof include a triphenylmethyl cation and the like. G is preferably a carbenium cation, and particularly preferably a triphenylmethyl cation.

Examples of (B $Q_1Q_2Q_3Q_4$) include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, teterakis(2,3,4-trifluorophenyl)borate, phenyltris(pentafluoro-phenyl) borate, tetrakis(3,5-bistrifluoromethylphenyl)borate and the like.

As specific combination of them, ferroceniumtetrakis (pentafluorophenyl)borate, 1,1'-dimethylferroceniumtetrakis(pentafluorophenyl)borate, silvertetrakis(pentafluorophenyl)borate, triphenylmethyltetrakis-(pentafluorophenyl) borate, triphenylmethyl-tetrakis(3,5-bistrifluoromethylphenyl)borate and the like are listed, and triphenylmethyltetrakis(pentafluorophenyl)borate is most preferable.

In the boron compound (C3) represented by the general formula $(J-H)^+(BQ_1Q_2Q_3Q_4)$, J is a neutral Lewis base, (J-H) is a Bronsted acid, B is a boron atom in the trivalent valence state, and $Q_1$ to $Q_4$ are as defined for $Q_1$ to $Q_4$ in the above-mentioned Lewis acid (C1).

Specific examples of the Bronsted acid $(J-H)^+$ in a compound represented by the general formula (J-H) $(BQ_1Q_2Q_3Q_4)$ include a trialkyl-substituted ammonium, N,N-dialkylanilinium, dialkylammonium, triaryl phosphonium and the like, and as the (B $Q_1Q_2Q_3Q_4$), the same compounds as described above are listed. As specific combination of them, there are listed triethylammoniumtetrakis (pentafluoro-phenyl)-borate, tripropylammoniumtetrakis (pentafluorophenyl)borate, tri(n-butyl)ammonium-tetrakis (pentafluorophenyl)borate, tri(n-butyl)ammoniumtetrakis(3, 5-bistrifluoromethyl-phenyl)borate, N,N-dimethyl-aniliniumtetrakis(pentafluoro-phenyl)borate, N,N-diethylaniliniumtetrakis(penta-fluorophenyl)borate, N,N-2, 4,6-pentamethylanilinium-tetrakis(pentafluorophenyl) borate, N,N-dimethylanilinium-tetrakis(3,5-bistrifluoromethyl-phenyl)borate, diisopropyl-ammoniumtetrakis(penta-fluorophenyl)borate, dicyclohexyl-ammoniumtetrakis-(pentafluorophenyl)borate, triphenylphosphoniumtetrakis(penta-fluorophenyl)borate, tri(methylphenyl)phosphoniumtetrakis(pentafluorophenyl)borate, tri(dimethylphenyl)-phosphonium-tetrakis (pentafluorophenyl)borate and the like, and tri(n-butyl) ammonium-tetrakis(pentafluorophenyl)borate or N,N-dimethylaniliniumtetrakis(pentafluoro-phenyl)borate is most preferable.

The molar ratio of metal complex:activating cocatalyst C1-C3 employed preferably ranges from 1:10 to 2:0, more preferably ranges from 1:5 to 1:0, and most preferably from 1:3 to 1:1.

The organoaluminum compound (E) is an aluminum compound having a carbon-aluminum bond, and one or more of aluminum compounds selected from the following (E1) to (E3) are preferable.

(E1) An organoaluminum compound represented by the general formula $T^1{}_aAlZ_{3-a}$ (E2) A cyclic aluminoxane having a structure represented by the general formula $\{-Al(T^2)-O-\}_b$ (E3) Linear aluminoxane having a structure represented by the general formula $T^3\{-Al(T^3)-O-\}_cAlT^3{}_2$ (wherein, each of $T^1$, $T^2$ and $T^3$ is hydrocarbon group, and all $T^1$, all $T^2$ and all $T^3$ may be the same or different respectively. Z in the organoaluminum compound (E1) represents a hydrogen atom or halogen atom, and all Z's may be the same or different, 'a' represents a number satisfying $0<a\leq 3$, 'b' is an integer of 2 or more, and 'c' is an integer of 1 or more).

The hydrocarbon group in E1, E2 or E3 is preferably a hydrocarbon group having 1 to 8 carbon atoms, and more preferably an alkyl group.

Specific examples of the organoaluminum compound (E1) represented by the general formula $T^1{}_aAlZ_{3-a}$ include trialkylaluminums such as trimethylaluminum, triethyl-aluminum, tripropylaluminum, triisobutylaluminum, trihexyl-aluminum and the like; dialkylaluminum chlorides such as dimethylaluminum chloride, diethylaluminum chloride, dipropylaluminum chloride, diisobutylaluminum chloride, dihexylaluminum chloride and the like; alkylaluminum dichlorides such as methylaluminum dichloride, ethylaluminum dichloride, propylaluminum dichloride, isobutylaluminum dichloride, hexylaluminum dichloride and the like; dialkylaluminum hydrides such as dimethylaluminum hydride, diethylaluminum hydride, dipropylaluminum hydride, diisobutylaluminum hydride, dihexylaluminum hydride and the like; and so forth.

A preferred activator-scavenger combination is $[CRh_3][B(C_6F_5)_4]$/MAO.

Specific examples of cyclic aluminoxane E2 having a structure represented by the general formula $\{-Al(T^2)-O-\}_b$ and the linear aluminoxane E3 having a structure represented by the general formula $T^3\{-Al(T^3)-O-\}_cAlT^3{}_2$ include alkyl groups such as a methyl group, ethyl group, n-propyl group, isopropyl group, n-butyl group, isobutyl group, n-pentyl group, neopentyl group and the like, b is an integer of 2 or more, c is an integer of 1 or more. Preferably, $T^2$ and $T^3$ represent a methyl group or isobutyl group, and b is 2 to 40 and c is 1 to 40.

The above-described aluminoxane is made by various methods. This method is not particularly restricted, and the aluminoxane may be produced according to a known method. For example, a solution prepared by dissolving at least one trialkylaluminum (for example, trimethylaluminum and the like) in a suitable organic solvent (benzene, an aliphatic hydrocarbon or the like) is allowed to contact with water to produce aluminoxane.

The molar ratio of metal complex (1):scavenger c) employed preferably ranges from 0.1:1000 to 0.1:10, more preferably ranges from 0.1:1000 to 0.1:300, and most preferably from 0.14:600 to 0.14:400.

Polymerization

The invention further provides a process for the polymerization of a polymer by polymerizing at least one, preferably at least two olefinic monomer comprising contacting said monomer with a metal complex of formula (1).

The metal complex of the formula (1) may also be used as a supported catalyst which comprises a organometallic compound of formula (1), a supporting material and optionally the activator (b) and/or a scavenger (c).

A supporting material is defined as an inorganic or organic compound that does not dissolve in the inert hydrocarbon solvent in which the process of the invention is carried out. Suitable inorganic supports include silica, magnesium halides, such as $MgF_2$, $MgCl_2$, $MgBr_2$, $MgI_2$, zeolites, and alumina. Suitable organic supports include polymers. Some non-limiting examples of polymeric supports are polyolefins such as polystryrene, polypropylene and polyethylene, polycondensates such as polyamides and polyesters and combinations thereof.

The preferred process for polymerization is generally concluded by contacting at least one preferably at least two olefinic monomers with the metal complex of the formula (1) or the catalyst system according to the present invention in the gas phase, in slurry, or in solution in an inert solvent preferable a hydrocarbon solvent. Suitable solvents are in the gas phase, in slurry, or in solution in an inert solvent preferable a hydrocarbon solvent. Suitable solvents are a $C_{5-12}$ hydrocarbon such as pentane, hexane, heptane, octane, isomers and mixtures thereof, cyclohexane, methylcyclohexane, pentamethyl heptane and hydrogenated naphtha. The process of the invention may be conducted at temperatures from 10 to 250° C., depending on the product being made.

Monomer Definition

An olefinic monomer is understood to be a molecule containing at least one polymerizable double bond.

Suitable olefinic monomers are $C_{2-20}$ olefins. Preferred monomers include ethylene and $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, and $C_{4-12}$ straight chained or cyclic hydrocarbyl radicals which are unsubstituted or substituted by a $C_{1-4}$ alkyl radical. Illustrative non-limiting examples of such a-olefins are propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-hepta-decene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These a-olefins may be used in combination.

The monomer may also be a polyene comprising at least two double bonds. The double bonds may be conjugated or non-conjugated in chains, ring systems or combinations thereof, and they may be endocyclic and/or exocyclic and may have different amounts and types of substituents. This means that the polyene may comprise at least one aliphatic, alicyclic or aromatic group, or combinations thereof.

Suitable polyenes include aliphatic polyenes and alicyclic polyenes. More specifically, aliphatic polyenes can be mentioned, such as 1,4-hexadiene, 3-methyl-1,4-hexadiene, 4-methyl-1,4-hexadiene, 5-methyl-1,4-hexadiene, 4-ethyl-1,4-hexadiene, 1,5-hexadiene, 3-methyl-1,5-hexadiene, 3,3- dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 1,6-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 1,7-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 1,8-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 1,9-decadiene, 1,5,9-decatriene, 6-methyl-1,6-undecadiene, 9-methyl-1,8-undecadiene and 1,13-tetradecadiene, 1,3-butadiene, isoprene.

Alicyclic polyenes may consist of at least one cyclic fragment. Examples of these alicyclic polyenes are vinylcyclohexene, vinylnorbornene, ethylidene norbornene, dicyclopentadiene, cyclooctadiene, 2,5-norbornadiene, 1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcyclooctane, 1,5-diallylcyclooctane, 1-allyl-4-isopropenylcyclohexane, 1-isopropenyl-4-vinylcyclohexane and 1-isopropenyl-3-vinylcyclopentane, and 1,4-cyclohexadiene. Preferred polyenes are polyenes having at least one endocyclic double bond and optionally at least one exocyclic double bond, such as 5-methylene-2-norbornene and 5-ethylidene-2-norbornene, 5-vinylnorbornene, and 2,5-norbornadiene, dicyclopentadiene and vinylcyclohexene.

Examples of aromatic polyenes are divinylbenzene (including its isomers), trivinyl-benzene (including its isomers) and vinylisopropenylbenzene (including its isomers).

All of the above-mentioned monomers may be further substituted with at least one group comprising a heteroatom of group 13-17, or combinations thereof.

Homopolymers, copolymers and copolymers on the basis of 3 or more of the above-mentioned olefinic monomers and also blends thereof can be prepared with the process of the present invention.

In a preferred embodiment copolymers on the basis of ethylene, at least one $C_{3-12}$ alpha olefin, preferably propylene.

In another preferred embodiment copolymers on the basis of ethylene, at least one $C_{3-12}$ alpha olefin, preferably propylene and at least one non-conjugated diene, preferably a diene selected from the group consisting of 5-methylene-2-norbornene 5-ethylidene-2-norbornene, 5-vinylnorbornene, 2,5-norbornadiene, dicyclopentadiene (DCPD) and vinylcyclohexene, preferably from the group consisting of 5-ethylidene-2-norbornene and 5-vinylnorbornene are made with metal complex of the present invention.

The invention further relates to polymers obtainable with the metal complex of the present invention or the catalyst system of the present invention. Below, the invention will be elucidated on the basis of the following examples and comparative experiments, without being limited thereto.

EXAMPLES

Test Methods.
Size Exclusion Chromatography with IR detector (SEC-IR)
Equipment: Freeslate Rapid GPC system with single detection (Suprared detector IR4 Standalone by Polymer Char)
Columns: PLGel Mixed-B 10 μm (×3300×7.5 mm columns)
Calibration: Calibration with linear polystyrene (PS) standards (molecular weight ca. 0.6-3000 kg/mol)
Temperature: 140° C.
Flow: 1.5 ml/min
Injection volume: 160 μl
Solvent/eluent: 1,2,4-trichlorobenzene with 0.4 g/l of BHT stabilizer
Sample preparation: Dissolving for 2 hours under continuous stirring at approx. 140° C. Filtration through 2 and 0.5 micron stainless steel filter Sample concentration 1.5 mg/ml
NMR ($^1$H, 400 MHz) spectra were measured on a Bruker Avance 400 spectrometer.
Fourier transformation suprared spectroscopy (FT-IR), was used to determine the composition of the copolymers according to the method that is known in the art in compliance with ASTM D3900 and ASTM D6047 standard. The FT-IR measurement gives the composition of the various monomers in weight percent relative to the total composition.
Composition was determined using mid-range FT-IR spectroscopy.

Part I: Synthesis of Ligands and Compounds

General

All manipulations were carried out using standard Schlenk line or dry-box techniques under an atmosphere of argon or nitrogen. Solvents were degassed by sparging with nitrogen and dried by passing through a column of the appropriate drying agent. Toluene was refluxed over sodium and distilled. Deuterated solvents were dried over potassium ($C_6D_6$) or $P_2O_5$ ($CDCl_3$ and $CD_2Cl_2$), distilled under reduced pressure and stored under nitrogen in Teflon valve ampoules. NMR samples were prepared under nitrogen in 5 mm Wilmad 507-PP tubes fitted with J. Young Teflon valves. $^1$H and $^{13}$C-{$^1$H} spectra were recorded at ambient temperature and referenced internally to residual protio-solvent ($^1$H) or solvent ($^{13}$C) resonances, and are reported relative to tetramethylsilane (d=0 ppm). Chemical shifts are quoted in δ (ppm) and coupling constants in Hz.

General Synthesis of dichloro($\eta^5$-cyclopenta[b]indolyl/cyclopenta[b]benzofuranyl) titanium amidinates To a solution of 1 equiv of ($\eta^5$-cyclopenta[b]indolyl/cyclopenta[b]benzofuranyl)titanium (IV) trichloride in toluene (20 ml/mmol) 5 equiv of triethylamine and 1 equiv of amidine were subsequently added. The resulting solution was stirred overnight at 60° C. and then evaporated to dryness. To the crude product toluene (10 ml/mmol) was added, and the obtained suspension was filtered through a pad of Celite 503. Thus obtained clear filtrate was evaporated to dryness, the residue was triturated with ether (1 ml/mmol), and to the formed mixture n-hexane (10 ml/mmol) was added. The precipitated solid of dichloro($\eta^5$-cyclopenta[b]indolyl/cyclopentabenzo[b]furanyl) titanium amidinate was filtered off, washed with ether (1 ml/mmol) and n-hexane (3×3 ml/mmol), and then dried in vacuum.

This synthesis will be used for the generation of the dichloro($\eta^5$-cyclopenta[b]indolyl/cyclopenta[b]benzofuranyl) titanium amidinate complexes in the following experimental part.

General Synthesis of dimethyl($\eta^5$-cyclopenta[b]indolyl/cyclopenta[b]benzofuranyl) titanium amidinates To a suspension of 1 equiv of dichloro($\eta^5$-/cyclopenta[b]indolyl/cyclopenta[b]benzofuranyl) titanium amidinate in ether (20 ml/mmol) cooled to −30° C. a solution of 2.05 equiv of MeMgBr in ether was added. This mixture was stirred overnight at room temperature, then evaporated to dryness. Toluene (10 ml/mmol) was added to the residue, and the obtained suspension was filtered through a pad of Celite 503. The filtrate was evaporated to dryness to yield dimethyl($\eta^5$-cyclopenta[b]indolyl/cyclopenta[b]benzofuranyl titanium amidinate. If required, this product was re-crystallized from n-hexane/methylcyclohexane at −30° C. to obtain the analytically pure material. The respective methyl compounds are designated with an M suffix.

This synthesis will be used for the generation of the dimethyl($\eta^5$-cyclopenta[b]indolyl/cyclopenta[b]benzofuranyl) titanium amidinate complexes in the following experimental part.

Closest—Example 1: Synthesis of dichloro(1,2,3-trimethyl-benzo[b]cyclopenta[d]thienyl) [(2,6-difluorophenyl)(piperidin-1-yl)methylene]titanamine (CE 1Cl) close to a process described in KR20170046462

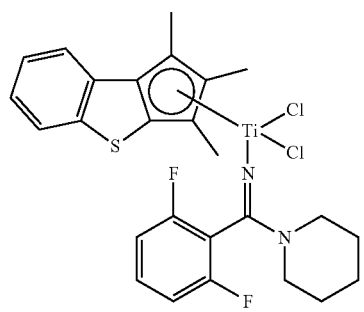

The described general synthesis for dichloro($\eta^5$-cyclopenta[b]indolyl/cyclopenta[b]benzofuranyl) titanium amidinates (vide supra) starting from trichloro(1,2,3-trimethyl-benzo[b]cyclopenta[d]thienyl)titanium (4.02 g, 10.9 mmol), 1-(2,6-difluorophenyl)-1-piperidin-1-ylmethanimine (2.44 g, 10.9 mmol), triethylamine (5.52 g, 54.4 mmol) and 70 ml of toluene. The yield was 3.82 g (63%) of a dark orange powder.

$^1$H NMR (CD$_2$Cl$_2$, 400 MHz): δ 7.87-7.89 (m, 1H), 7.69-7.71 (m, 1H), 7.30-7.41 (m, 3H), 6.96-7.00 (m, 2H), 3.29-3.42 (m, 2H), 3.09-3.19 (m, 2H), 2.48 (s, 3H), 2.23 (s, 3H), 2.21 (s, 3H), 1.49-1.63 (m, 6H).

$^{19}$F NMR (CD$_2$Cl$_2$, 376 MHz): δ −111.15 (m, 1F), −111.22 (m, 1F).

Synthesis of dimethyl(1,2,3-trimethyl-benzo[b]cyclopenta[d]thienyl)[(2,6-difluorophenyl)(piperidin-1-yl)methylene]titanamine (CE 1M)

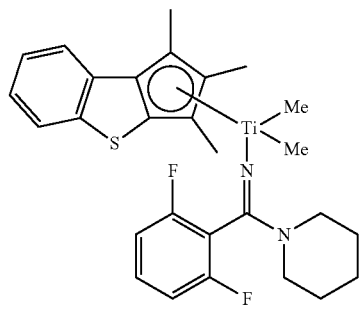

The described general synthesis for dimethyl($\eta^5$-cyclopenta[b]indolyl/cyclopenta[b]benzofuranyl) titanium amidinates (vide supra) was used starting from dichloro(1,2,3-trimethyl-benzo[b]cyclopenta[d]thienyl) [(2,6-difluorophenyl)(piperidin-1-yl)methylene]titanamine. Yield: 53%.

$^1$H NMR (CD$_2$Cl$_2$, 400 MHz): δ 7.77-7.79 (m, 1H), 7.47-7.49 (m, 1H), 7.14-7.15 (m, 1H), 6.98-7.02 (m, 1H), 6.48-6.58 (m, 3H), 3.47-3.61 (m, 2H), 2.81-2.92 (m, 2H), 2.29 (s, 3H), 2.09 (s, 3H), 1.84 (s, 3H), 1.25-1.35 (m, 2H), 1.08-1.17 (m, 4H), 0.49 (s, 3H), 0.41 (s, 3H).

Synthesis of cyclopenta[b]benzofuranyl Complexes

Synthesis of Cpd1M 1,2-Dimethyl-1,2-dihydro-3H-cyclopenta[b]benzofuran-3-one

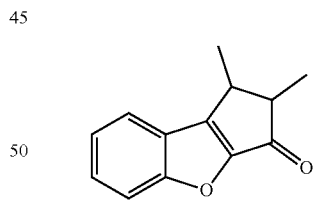

To a solution of 20.0 g (169 mmol) of 1-benzofuran in 300 ml of THF 67.7 ml of 2.5M (169 mmol) n-butyllithium in hexanes in hexanes was added at −10° C. The reaction mixture was stirred for 1 h at this temperature, then cooled to −30° C., followed by addition of a solution of 24.2 g (177 mmol) of ZnCl$_2$ in 300 ml of THF. The resulting mixture was warmed to room temperature and them stirred for 30 min. Further on, 1.15 g (1.00 mmol) of Pd(PPh$_3$)$_4$ and 22.1 g (186 mmol) of trans-2-methyl-2-butenoyl chloride were added. After 2 h of stirring the reaction mixture was poured into ice-cold water, the organic phase was separated, and the aqueous layer was extracted with 3×100 ml of ethyl acetate. The combined organic extract was dried over Na$_2$SO$_4$ and then evaporated to dryness. The residue was dissolved in 1000 ml of dichloromethane, and to the obtained solution 1 ml of methanesulfonic acid was added. This mixture was stirred for 12 h at room temperature and then poured into 1 liter of cold water. The crude product was extracted with 3×300 ml of ether. The combined organic extract was passed through a pad of silica gel 60 (40-63 um) and then evaporated to dryness. The crude product was purified by flash chromatography on silica gel 60 (40-63 urn; eluent: hexane/ethyl acetate=10:1, vol.). This procedure gave 8.21 g (24%) of a ca 1 to 1 mixture of two diastereomers as a yellow viscous oil.

$^{1}$H NMR (CDCl$_3$, 400 MHz): δ 7.70 (t, J=6.5 Hz, 1H), 7.58 (d, J=8.4 Hz, 1H), 7.49 (t, J=7.9 Hz, 1H), 7.29-7.37 (m, 1H), 3.52-3.64 (m, 1H), 3.09-3.23 (m, 1H), 3.02 (qd, J=7.1 Hz, J=1.8 Hz, 1H), 2.56 (qd, J=7.5 Hz, J=2.2 Hz, 1H), 1.51 (d, J=7.2 Hz, 3H), 1.37 (d, J=4.9 Hz, 3H), 1.35 (d, J=4.8 Hz, 3H), 1.27 (d, J=7.8 Hz, 3H).

1,2,3-Trimethyl-1H-cyclopenta[b]benzofuran

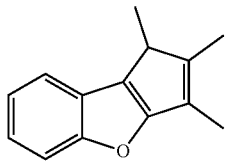

To a solution of 5.00 g (25.0 mmol) of 1,2-dimethyl-1,2-dihydro-3H-cyclopenta[b]benzofuran-3-one in 100 ml of THF 13.0 ml of 2.90M (37.5 mmol) of MeMgBr in ether was added. The resulting mixture was stirred overnight at 65° C. and then accurately poured into ice-cold 5% HCl. The organic phase was separated, and the aqueous layer was extracted with 3×100 ml of ethyl acetate. The combined organic extract was dried over Na$_2$SO$_4$ and then evaporated to dryness. The crude product was purified by flash chromatography on silica gel 60 (40-63 urn; eluent: hexane). This procedure gave 2.90 g (58%) of a yellow oil.

$^{1}$H NMR (CDCl$_3$, 400 MHz): δ 7.45 (d, J=8.0 Hz, 1H), 7.48 (d, J=8.4 Hz, 1H), 7.15-7.24 (m, 1H), 7.04-7.15 (m, 1H), 3.10-3.22 (m, 1H), 2.08 (s, 3H), 2.01 (s, 3H), 1.32-1.36 (m, 3H).

($\eta^5$-1,2,3-Trimethylcyclopenta[b]benzofuranyl)titanium(IV) trichloride

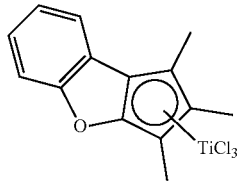

To a solution of 1.48 g (14.6 mmol) of N,N-diisopropylamine in 120 ml of THF 5.84 ml of 2.5M (14.6 mmol) n-butyllithium in hexanes was added at −50° C. The resulting mixture was stirred for 30 min at room temperature, then cooled to −50° C., followed by addition of 2.90 g (22.6 mmol) of 1,2,3-trimethyl-1H-cyclopenta[6]benzofuran. The obtained solution was stirred for 1 h at room temperature, then cooled to −80° C., and 3.80 g (14.6 mmol) of tris (isopropoxy)titanium chloride was added. The reaction mixture was stirred overnight at room temperature and then evaporated to dryness. The crude ($\eta^5$-1,2,3-trimethylcyclopenta[b]benzofuranyl)triisopropoxytitanium(IV) was dissolved in 200 ml of toluene, and then 12.4 g (73.0 mmol) of SiCl$_4$ was added. The obtained suspension was stirred overnight at 60° C. and then evaporated to dryness. To the residue 200 ml of dichloromethane was added, and the obtained suspension was filtered through a pad of Celite 503. The filtrate was evaporated to dryness, and the crude product was re-crystallized from 80 ml of methylcyclohexane. Yield 4.12 g (80%) of a brown powder.

$^{1}$H NMR (CDCl$_3$, 400 MHz): δ 7.75-7.86 (m, 1H), 7.54-7.63 (m, 1H), 7.49 (td, J=7.9 Hz, J=1.3 Hz, 1H), 7.33-7.43 (m, 1H), 2.77 (s, 3H), 2.55 (s, 3H), 2.53 (s, 3H).

Dichloro($\eta^5$-1,2,3-trimethylcyclopenta[b]benzofuranyl)[2-(2,6-difluorophenyl)-2,3-dihydro-1H-isoindol-1-ylidene]titanamine

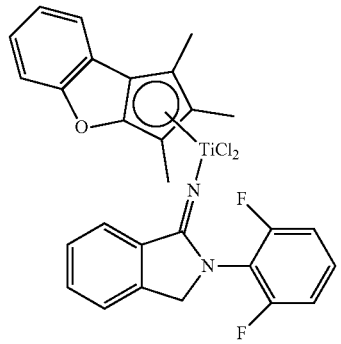

The described general synthesis for dichloro($\eta^5$-cyclopenta[b]indolyl/cyclopenta[b]benzofuranyl) titanium amidinates (vide supra) was used starting from ($\eta^5$-1,2,3-trimethylcyclopenta[b]benzofuranyl)titanium(IV) trichloride and 2-(2,6-difluorophenyl)isoindolin-1-imine. Yield: 1.52 g (64%).

$^{1}$H NMR (CDCl$_3$, 400 MHz): δ 7.52 (d, J=7.5 Hz, 1H), 7.38-7.43 (m, 1H), 7.31-7.38 (m, 2H), 7.10-7.15 (m, 2H), 7.04-7.08 (m, 2H), 6.96 (t, J=7.5 Hz, 1H), 6.87 (d, J=7.4 Hz, 1H), 6.81 (t, J=7.8 Hz, 1H), 4.94 (d, J=17.1 Hz, 1H), 4.67 (d, J=17.1 Hz, 1H), 2.46 (s, 3H), 2.21 (s, 3H), 1.82 (s, 3H).

Dimethyl($\eta^5$-1,2,3-trimethylcyclopenta[b]benzofuranyl)[2-(2,6-difluorophenyl)-2,3-dihydro-1H-isoindol-1-ylidene]titanamine CPD1M

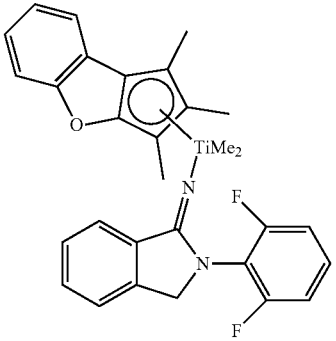

The described general synthesis for dimethyl($\eta^5$-cyclopenta[b]indolyl/cyclopenta[b]benzofuranyl) titanium amidinates (vide supra) was used starting from dichloro($\eta^5$-1,2,3-trimethylcyclopenta[b]benzofuranyl)[2-(2,6-difluorophenyl)-2,3-dihydro-1H-isoindol-1-ylidene]titanamine. Yield: 786 mg (56%).

$^1$H NMR (C$_6$D$_6$, 400 MHz): δ 7.47 (m, 2H), 7.29 (d, J=7.7 Hz, 1H), 6.89-7.11 (m, 4H), 6.77 (d, J=7.5 Hz, 1H), 6.59 (d, J=5.7 Hz, 3H), 4.20 (br.s., 2H), 2.17 (s, 3H), 2.04 (s, 3H), 1.79 (s, 3H), 0.52 (s, 6H).

Synthesis of CPD2M 1,2-Dimethyl-3-phenyl-1H-cyclopenta[b]benzofuran

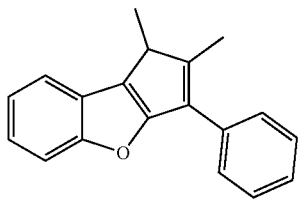 [SMILES: CC1=C(c2ccccc2)c2oc3ccccc3c2C1C]

To a 14.1 ml of 2.7 M (38.0 mmol) phenylmagnesium bromide in ether 1.61 g (38.0 mmol) of LiCl, 590 mg (3.80 mmol) of anhydrous ZnCl$_2$, and 10.1 ml of 1.0 M (10.1 mmol) trimethylsilylmethylmagnesium chloride in ether were subsequently added. The obtained solution was stirred for 30 min at room temperature, then cooled to 0° C., followed by addition of 100 ml of THF and 5.86 g (29.0 mmol) of 1,2-dimethyl-1,2-dihydro-3H-cyclopenta[b]benzofuran-3-one. The reaction mixture was refluxed for 2 h and then poured into 100 ml of saturated NH$_4$Cl followed by addition of 10 ml of 5% HCl. The aqueous phase was extracted with 3×70 ml of ether, the combined organic extract was dried over Na$_2$SO$_4$ and then evaporated to dryness. The residue was purified by flash chromatography on silica gel 60 (40-63 urn, eluent: hexane). Yield: 1.20 g (16%) of an off-white solid.

$^1$H NMR (CDCl$_3$, 400 MHz): δ 7.62-7.72 (m, 2H), 7.44-7.54 (m, 4H), 7.31-7.38 (m, 1H), 7.23 (td, J=7.5, 0.8 Hz, 1H), 7.11-7.18 (m, 1H), 3.35 (q, J=7.6 Hz, 1H), 2.27 (s, 3H), 1.46 (d, J=7.7 Hz, 3H).

($\eta^5$-1,2-Dimethyl-3-phenylcyclopenta[b]benzofuranyl)titanium(IV) trichloride

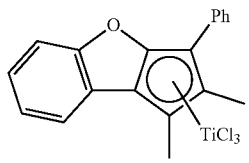

To a solution of 1.20 g (4.61 mmol) of 1,2-dimethyl-3-phenyl-1H-cyclopenta[b]benzofuran in 70 ml of THF 1.84 ml of 2.5 M (4.61 mmol) n-butyllithium in hexanes was added at −50° C. The obtained solution was stirred for 1 h at room temperature, then cooled to −80° C., and 1.20 g (4.61 mmol) of tris(isopropoxy)titanium chloride was added. The reaction mixture was stirred overnight at room temperature and then evaporated to dryness. The crude ($\eta^5$-1,2-dimethyl-3-phenylcyclopenta[b]benzofuranyl)triisopropoxytitanium(IV) was dissolved in 80 ml of dry toluene, and 3.92 g (23.1 mmol) of SiCl$_4$ was added. The obtained suspension was stirred overnight at 60° C. and then evaporated to dryness. To the residue 40 ml of dichloromethane was added, and the obtained suspension was filtered through a pad of Celite 503. The filtrate was evaporated to dryness, and the crude product was re-crystallized from 50 ml of methylcyclohexane. Yield: 1.20 g (63%) of a dark brown powder.

$^1$H NMR (CDCl$_3$, 400 MHz): δ 7.93 (d, J=7.8 Hz, 2H), 7.87 (d, J=7.7 Hz, 1H), 7.64 (d, J=8.3 Hz, 1H), 7.54 (m, 2H), 7.38-7.48 (m, 3H), 2.86 (s, 3H), 2.81 (s, 3H).

Dichloro[($\eta^5$-1,2-dimethyl-3-phenylcyclopenta[b]benzofuranyl)][2-(2,6-difluorophenyl)-2,3-dihydro-1H-isoindol-1-ylidene]titanamine

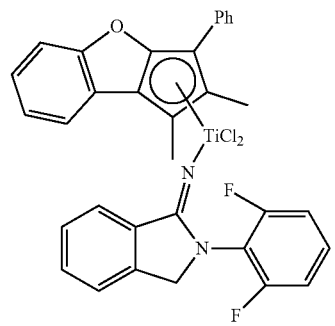

The described general synthesis for dichloro($\eta^5$-cyclopenta[b]indolyl/cyclopenta[b]benzofuranyl) titanium amidinates (vide supra) was used starting from ($\eta^5$-1,2-dimethyl-3-phenylcyclopenta[b]benzofuranyl)titanium(IV) trichloride and 2-(2,6-difluorophenyl)isoindolin-1-imine. Yield: 457 mg (51%).

$^1$H NMR (CDCl$_3$, 400 MHz): δ 7.57-7.68 (m, 2H), 7.37-7.44 (m, 1H), 7.32 (m, 2H), 7.20-7.28 (m, 3H), 7.11-7.20 (m, 3H), 7.00-7.11 (m, 3H), 6.79-6.92 (m, 2H), 6.77 (d, J=7.7 Hz, 1H), 4.81 (d, J=17.4 Hz, 1H), 4.65 (d, J=17.4 Hz, 1H), 2.51 (s, 3H), 2.45 (s, 3H).

Dimethyl[($\eta^5$-1,2-dimethyl-3-phenylcyclopenta[b]benzofuranyl)][2-(2,6-difluorophenyl)-2,3-dihydro-1H-isoindol-1-ylidene]titanamine CPD2M

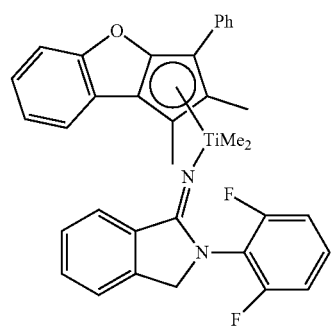

The described general synthesis for dimethyl($\eta^5$-cyclopenta[b]indolyl/cyclopenta[b]benzofuranyl) titanium amidinates (vide supra) was used starting from dichloro[(η⁵-1,2-dimethyl-3-phenylcyclopenta[b]benzofuranyl)][2-(2,6-difluorophenyl)-2,3-dihydro-1H-isoindol-1-ylidene]titanamine. Yield: 215 mg (48%).

¹H NMR (C₆D₆, 400 MHz): δ 7.90 (dd, J=8.4, 1.2 Hz, 2H), 7.48-7.57 (m, 1H), 7.30-7.40 (m, 1H), 7.19-7.30 (m, 3H), 6.87-7.10 (m, 5H), 6.75 (d, J=7.4 Hz, 1H), 6.48-6.64 (m, 3H), 4.06-4.23 (m, 2H), 2.14 (s, 3H), 2.11 (s, 3H), 0.57 (s, 3H), 0.54 (s, 3H).

Synthesis of CPD3M 2,3-Dimethyl-1H-cyclopenta[b]benzofuran

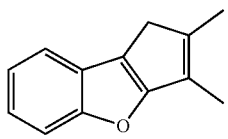

To a solution of 4.00 g (21.5 mmol) of 2-methyl-1,2-dihydro-3H-cyclopenta[b]benzofuran-3-one in 100 ml of THF 14.8 ml of 2.9 M (43.0 mmol) MeMgBr in ether was added, and the resulting mixture was stirred overnight at 65° C., then accurately poured into ice-cold 5% HCl. The organic phase was separated, and the aqueous layer was extracted with 3×100 ml of ethyl acetate. The combined organic extract was dried over Na₂SO₄ and then evaporated to dryness. The crude product was purified by flash chromatography on silica gel 60 (40-63 urn, eluent: hexane). Yield: 2.0 g (50%) of a yellow solid.

¹H NMR (CDCl₃, 400 MHz): δ 7.51 (d, J=8.1 Hz, 1H), 7.41-7.48 (m, 1H), 7.22 (td, J=7.5, 1.1 Hz, 1H), 7.08-7.18 (m, 1H), 3.11 (s, 2H), 2.11 (s, 6H).

(η⁵-1,2-Dimethylcyclopenta[b]benzofuranyl)titanium(IV) trichloride

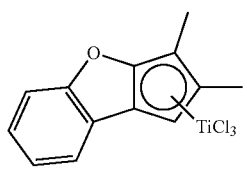

To a solution of 1.70 g (9.20 mmol) of 2,3-dimethyl-1H-cyclopenta[b]benzofuran in 100 ml of THF 3.69 ml of 2.5 M (9.20 mmol) n-butyllithium in hexanes was added at −50° C. The obtained solution was stirred for 1 h at room temperature, then cooled to −80° C., and 2.40 g (9.20 mmol) of tris(isopropoxy)titanium chloride was added. The reaction mixture was stirred overnight at room temperature and then evaporated to dryness. The crude (η⁵-1,2-dimethylcyclopenta[b]benzofuranyl)triisopropoxytitanium(IV) was dissolved in 100 ml of dry toluene, and 7.84 g (46.1 mmol) of SiCl₄ was added. The obtained suspension was stirred overnight at 60° C. and then evaporated to dryness. To the residue 150 ml of dichloromethane was added, and the obtained suspension was filtered through a pad of Celite 503. The filtrate was evaporated to dryness, and the crude product was re-crystallized from 100 ml of methylcyclohexane. Yield: 1.90 g (61%) of a red-brown powder.

¹H NMR (CDCl₃, 400 MHz): δ 7.77 (d, J=7.8 Hz, 1H), 7.54-7.63 (m, 1H), 7.49 (t, J=7.1 Hz, 1H), 7.31-7.42 (m, 1H), 6.80 (s, 1H), 2.61 (s, 3H), 2.54 (s, 3H).

Dichloro(η⁵-1,2-dimethylcyclopenta[b]benzofuranyl)[2-(2,6-difluorophenyl)-2,3-dihydro-1H-isoindol-1-ylidene]titanamine

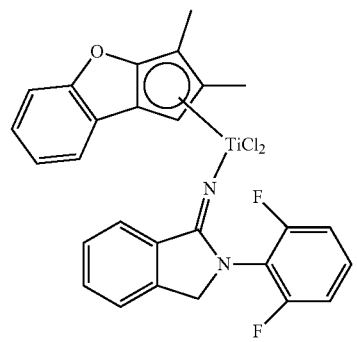

The described general synthesis for dichloro(η⁵-cyclopenta[b]indolyl/cyclopenta[b]benzofuranyl) titanium amidinates (vide supra) was used starting from (η⁵-1,2-dimethylcyclopenta[b]benzofuranyl)titanium(IV) trichloride and 2-(2,6-difluorophenyl)isoindolin-1-imine. Yield: 900 mg (56%).

¹H NMR (CDCl₃, 400 MHz): δ 7.49 (d, J=8.4 Hz, 1H), 7.31-7.44 (m, 2H), 7.02-7.18 (m, 5H), 6.92 (td, J=7.5, 0.9 Hz, 1H), 6.76-6.83 (m, 2H), 6.34 (s, 1H), 4.96 (d, J=17.4 Hz, 1H), 4.65 (d, J=17.4 Hz, 1H), 2.32 (s, 3H), 1.79 (s, 3H).

Dimethyl(η⁵-1,2-dimethylcyclopenta[b]benzofuranyl)[2-(2,6-difluorophenyl)-2,3-dihydro-1H-isoindol-1-ylidene]titanamine CPD3M

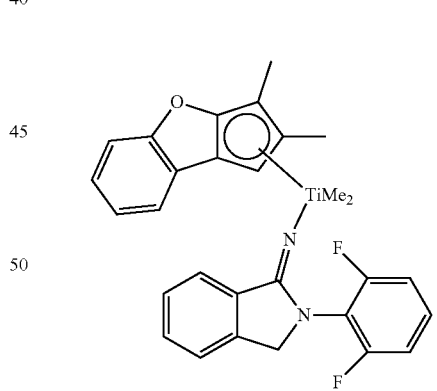

The described general synthesis for dimethyl(η⁵-cyclopenta[b]indolyl/cyclopenta[b]benzofuranyl) titanium amidinates (vide supra) was used starting from dichloro(η⁵-1,2-dimethylcyclopenta[b]benzofuranyl)[2-(2,6-difluorophenyl)-2,3-dihydro-1H-isoindol-1-ylidene]titanamine. Yield: 296 mg (35%).

¹H NMR (C₆D₆, 400 MHz): δ 7.47 (d, J=8.1 Hz, 1H), 7.43 (dd, J=7.4, 1.6 Hz, 1H), 7.27 (d, J=7.9 Hz, 1H), 7.02-7.09 (m, 1H), 6.87-7.02 (m, 3H), 6.77 (d, J=7.4 Hz, 1H), 6.49-6.69 (m, 3H), 5.87 (s, 1H), 4.08-4.30 (m, 2H), 2.01 (s, 3H), 1.91 (s, 3H), 0.57 (s, 3H), 0.50 (s, 3H).

Synthesis of cyclopenta[b]indolyl Complexes

Synthesis of CPD4M 1,2,4-Trimethyl-3-phenyl-1,4-dihydrocyclopenta[b]indole

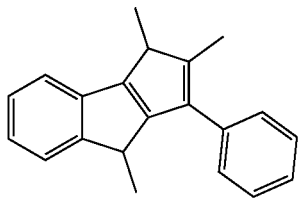 [SMILES: CC1=C(c2ccccc2)C2=C(c3ccccc3C2C)C1C]

To 9.3 ml of 2.7M (25.2 mmol) phenylmagnesium bromide in ether 1.07 g (25.2 mmol) of LiCl, 400 mg (2.52 mmol) of $ZnCl_2$, and 6.79 ml of 1.0 M (6.79 mmol) trimethylsilylmethylmagnesium chloride in ether were subsequently added. The obtained solution was stirred for 30 min at room temperature, then cooled to 0° C. followed by addition of 100 ml of THF and 4.14 g (19.4 mmol) of 1,2,4-trimethyl-1,4-dihydrocyclopenta[b]indol-3(2H)-one. The reaction mixture was refluxed for 2 h and then poured into 100 ml of saturated $NH_4Cl$ followed by addition of 10 ml of 5% HCl. The aqueous phase was extracted with 3×70 ml of diethyl ether, the combined organic extract was dried over $Na_2SO_4$ and then evaporated to dryness. The residue was purified by flash chromatography on silica gel 60 (40-63 urn; eluent: hexane). Yield 3.42 g (65%) of an off-white solid.

$^1$H NMR ($CDCl_3$, 400 MHz): δ 7.56-7.66 (m, 1H), 7.34-7.52 (m, 5H), 7.26-7.34 (m, 1H), 7.07-7.18 (m, 2H), 3.49 (s, 3H), 3.39 (q, J=7.6 Hz, 1H), 2.03 (s, 3H), 1.45-1.52 (m, 3H).

($\eta^5$-1,2,4-Trimethyl-3-phenylcyclopenta[b]indolyl)titanium(IV) trichloride

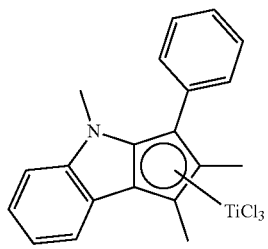

To a solution of 3.42 g (12.5 mmol) of 1,2,4-trimethyl-3-phenyl-1,4-dihydrocyclopenta[b]indole in 200 ml of THF 5.00 ml of 2.5M (12.5 mmol) n-butyllithium in hexanes was added at −50° C. The obtained solution was stirred for 1 h at room temperature, then cooled to −80° C., and 3.26 g (12.5 mmol) of tris(isopropoxy)titanium chloride was added. The reaction mixture was stirred overnight at room temperature and then evaporated to dryness. The crude ($\eta^5$-1,2,4-trimethyl-3-phenylcyclopenta[b]indolyl)triisopropoxytitanium (IV) was dissolved in 200 ml of toluene, and 10.6 g (62.5 mmol) of $SiCl_4$ was added. The obtained suspension was stirred overnight at 60° C. and then evaporated to dryness. To the residue 300 ml of dichloromethane was added, and the obtained suspension was filtered through a pad of Celite 503. The filtrate was evaporated to dryness, and the crude product was re-crystallized from 400 ml of methylcyclohexane. Yield 4.69 g (88%) of a dark violet powder.

$^1$H NMR ($CDCl_3$, 400 MHz): δ 7.99 (d, J=7.9 Hz, 1H), 7.64 (m, 2H), 7.47-7.53 (m, 4H), 7.33 (m, 2H), 3.65 (s, 3H), 2.91 (s, 3H), 2.55 (s, 3H).

Dichloro($\eta^5$-1,2,4-trimethyl-3-phenylcyclopenta[b]indolyl)[2-(2,6-difluorophenyl)-2,3-dihydro-1H-isoindol-1-ylidene]titanamine

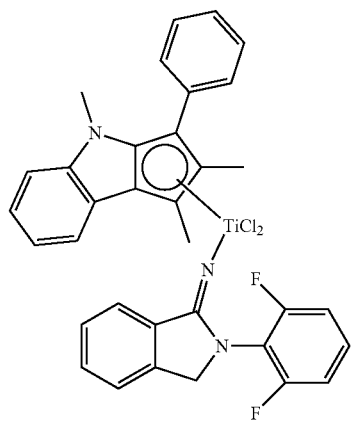

The described general synthesis for dichloro($\eta^5$-cyclopenta[b]indolyl/cyclopenta[b]benzofuranyl) titanium amidinates (vide supra) was used starting from ($\eta^5$-1,2,4-Trimethyl-3-phenylcyclopenta[b]indolyl)titanium(IV) trichloride and 2-(2,6-difluorophenyl)isoindolin-1-imine. Yield: 1.03 g (46%).

$^1$H NMR ($CDCl_3$, 400 MHz): δ 7.73 (d, J=7.4 Hz, 1H), 7.27-7.45 (m, 8H), 7.09-7.19 (m, 3H), 6.92-7.09 (m, 3H), 6.70 (d, J=7.9 Hz, 1H), 4.76 (s, 2H), 3.42 (s, 3H), 2.44 (s, 3H), 2.16 (s, 3H).

Dimethyl($\eta^5$-1,2,4-trimethyl-3-phenylcyclopenta[b]indolyl)[2-(2,6-difluorophenyl)-2,3-dihydro-1H-isoindol-1-ylidene]titanamine

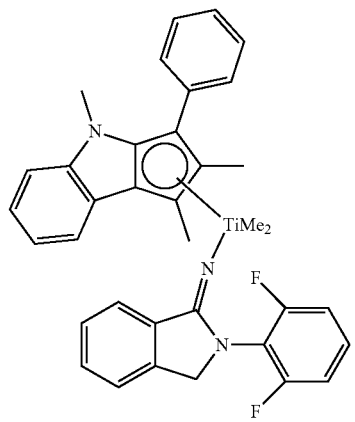

The described general synthesis for dimethyl($\eta^5$-cyclopenta[b]indolyl/cyclopenta[b]benzofuranyl) titanium amidinates (vide supra) was used starting from dichloro($\eta^5$-1,2,4-trimethyl-3-phenylcyclopenta[b]indolyl)[2-(2,6-difluorophenyl)-2,3-dihydro-1H-isoindol-1-ylidene]titanamine. Yield: 312 mg (32%).

$^1$H NMR (C$_6$D$_6$, 400 MHz): δ 7.84 (d, J=7.3 Hz, 1H), 7.38 (d, J=6.8 Hz, 2H), 7.08-7.24 (m, 6H), 6.90-7.08 (m, 2H), 6.77 (t, J=7.8 Hz, 2H), 6.51-6.70 (m, 3H), 4.24 (d, J=16.3 Hz, 1H), 4.14 (d, J=16.3 Hz, 1H), 3.11 (s, 3H), 2.44 (s, 3H), 2.09 (s, 3H), 0.57 (s, 6H).

Synthesis of CPD5M 2,4-Dimethyl-1,4-dihydrocyclopenta[b]indol-3(2H)-one

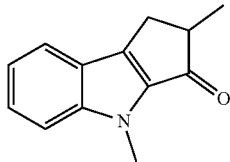

To Eaton's reagent (prepared from 22 g of P$_4$O$_{10}$ and 200 ml of methanesulfonic acid) 90.5 g (690 mmol) of N-methylindole and 67.1 g (780 mmol) of methacrylic acid were added at 70° C. This mixture was stirred for 2 h at this temperature and then poured into ice-cold water. The product was extracted with 3×300 ml of ether. The combined organic extract was passed through a pad of silica gel 60 (40-63 urn) and then evaporated to dryness. The crude product was purified by flash chromatography on silica gel 60 (40-63 urn, eluent: hexane/ethyl acetate=10:1, vol.). Yield 27.7 g (20%) of a yellow viscous oil.

$^1$H NMR (CDCl$_3$, 400 MHz): δ 7.68 (d, J=8.1 Hz, 1H), 7.31-7.45 (m, 2H), 7.12-7.21 (m, 1H), 3.91 (s, 3H), 3.32 (dd, J=16.7 Hz, J=6.4 Hz, 1H), 2.95-3.11 (m, 1H), 2.64 (dd, J=16.7 Hz, J=2.1 Hz, 1H), 1.36 (d, J=7.5 Hz, 3H).

3-Isopropyl-2,4-dimethyl-1,4-dihydrocyclopenta[b]indole

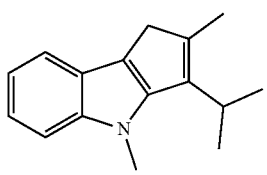 [SMILES: CC1=C(C(C)C)c2c(c3ccccc3n2C)C1]

To 53.8 ml of 0.93M (50.0 mmol) of adduct of isopropylmagnesium chloride with LiCl in THF 950 mg (7.00 mmol) of ZnCl$_2$ and 14.0 ml of 1.0M (14.0 mmol) trimethylsilylmethylmagnesium chloride in ether were subsequently added. The obtained solution was stirred for 30 min at room temperature, then cooled to 0° C. followed by an addition of 8.97 g (45.0 mmol) of 2,4-dimethyl-1,4-dihydrocyclopenta[b]indol-3(2H)-one. The reaction mixture was refluxed for 2 h and then poured into 100 ml of saturated NH$_4$Cl followed by addition of 10 ml of 5% HCl. The aqueous phase was extracted with 3×70 ml of ether, the combined organic extract was dried over Na$_2$SO$_4$ and then evaporated to dryness. The residue was purified by flash chromatography on silica gel 60 (40-63 urn; eluent: hexane). Yield 4.70 g (46%) of the title product as a yellow-white solid. The obtained material had ca.70% purity, and the major impurity was found to be 2,4-dimethyl-3-(propan-2-ylidene)-1,2,3,4-tetrahydrocyclopenta[6]indole.

$^1$H NMR (CDCl$_3$, 400 MHz): δ 7.41-7.52 (m, 1H), 7.27-7.36 (m, 1H), 7.03-7.14 (m, 2H), 3.93 (s, 3H), 3.28 (sept, J=7.1 Hz, 1H), 3.14 (s, 2H), 2.19 (s, 3H), 1.38 (d, J=7.1 Hz, 6H).

($\eta^5$-3-Isopropyl-2,4-dimethylcyclopenta[b]indolyl) titanium(IV) trichloride

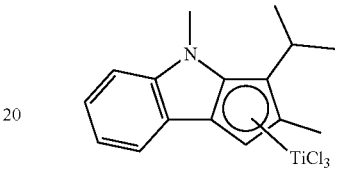

To a solution of 4.70 g (20.8 mmol) of 3-isopropyl-2,4-dimethyl-1,4-dihydrocyclopenta[b]indole in 200 ml of THF 5.83 ml of 2.5M (14.6 mmol) n-butyllithium in hexanes was added at −50° C. The obtained solution was stirred for 1 h at room temperature, cooled to −80° C., and 3.81 g (14.6 mmol) of tris(isopropoxy)titanium chloride was added. The reaction mixture was stirred overnight at room temperature and then evaporated to dryness. The crude ($\eta^5$-3-Isopropyl-2,4-dimethylcyclopenta[b]indolyl)triisopropoxytitanium (IV) was dissolved in 200 ml of dry toluene, and 12.4 g (72.8 mmol) of SiCl$_4$ was added. The obtained suspension was stirred overnight at 60° C. and then evaporated to dryness. To the residue 300 ml of dichloromethane was added, and the obtained suspension was filtered through a pad of Celite 503. The filtrate was evaporated to dryness, and the crude product was re-crystallized twice from 100 ml of methylcyclohexane. Yield 3.10 g (39%) of a dark violet powder.

$^1$H NMR (CDCl$_3$, 400 MHz): δ 7.87 (dd, J=7.8, 0.4 Hz, 1H), 7.49 (ddd, J=8.3, 7.2, 1.2 Hz, 1H), 7.34 (d, J=8.4 Hz, 1H), 7.23-7.31 (m, 1H), 6.81 (s, 1H), 3.99-4.13 (m, 3H), 3.69 (sept, J=7.2 Hz, 1H), 2.71 (s, 3H), 1.60 (d, J=7.2 Hz, 3H), 1.49 (d, J=7.1 Hz, 3H).

Dichloro[($\eta^5$-3-isopropyl-2,4-dimethylcyclopenta[b]indolyl)][2-(2,6-difluorophenyl)-2,3-dihydro-1H-isoindol-1-ylidene]titanamine

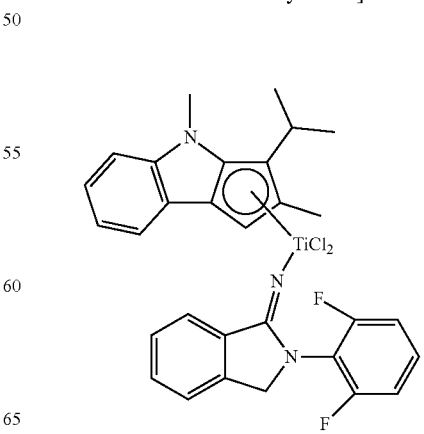

The described general synthesis for dichloro(η⁵-cyclopenta[b]indolyl/cyclopenta[b]benzofuranyl) titanium amidinates (vide supra) was used starting from (η⁵-3-isopropyl-2,4-dimethylcyclopenta[b]indolyl)titanium(IV) trichloride and 2-(2,6-difluorophenyl)isoindolin-1-imine. Yield: 1.51 g (63%).

¹H NMR (CDCl₃, 400 MHz): δ 7.58 (d, J=7.7 Hz, 1H), 7.28-7.46 (m, 3H), 6.93-7.15 (m, 5H), 6.88 (t, J=7.4 Hz, 1H), 6.53 (d, J=7.7 Hz, 1H), 6.22 (s, 1H), 4.84 (d, J=17.1 Hz, 1H), 4.73 (d, J=17.1 Hz, 1H), 3.80 (s, 3H), 3.38 (sept, J=6.9 Hz, 1H), 2.36 (s, 3H), 1.31 (d, J=7.2 Hz, 3H), 1.24 (d, J=7.4 Hz, 3H).

Dimethyl[(η⁵-3-isopropyl-2,4-dimethylcyclopenta[b]indolyl)][2-(2,6-difluorophenyl)-2,3-dihydro-1H-isoindol-1-ylidene]titanamine

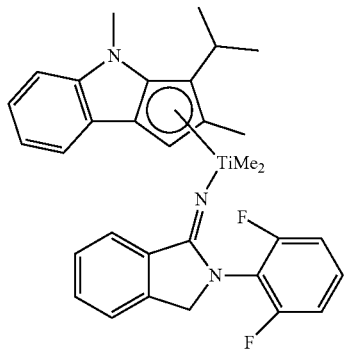

The described general synthesis for dimethyl(η⁵-cyclopenta[b]indolyl/cyclopenta[b]benzofuranyl) titanium amidinates (vide supra) was used starting from dichloro[(η⁵-3-isopropyl-2,4-dimethylcyclopenta[b]indolyl)][2-(2,6-difluorophenyl)-2,3-dihydro-1H-isoindol-1-ylidene]titanamine. Yield: 690 mg (47%).

¹H NMR (C₆D₆, 400 MHz): δ 7.74 (dd, J=7.5, 0.7 Hz, 1H), 7.17-7.22 (m, 1H), 6.92-7.12 (m, 4H), 6.72-6.90 (m, 2H), 6.49-6.72 (m, 3H), 6.23 (s, 1H), 4.27 (d, J=16.5 Hz, 1H), 4.16 (d, J=16.2 Hz, 1H), 3.30 (s, 3H), 3.08 (sept, J=7.1 Hz, 1H), 2.20 (s, 3H), 1.19 (d, J=7.1 Hz, 3H), 1.13 (d, J=7.1 Hz, 3H), 0.58 (s, 3H), 0.51 (s, 3H).

Synthesis of CPD6M

3-Isopropyl-1,2,4-trimethyl-1,4-dihydrocyclopenta[b]indole

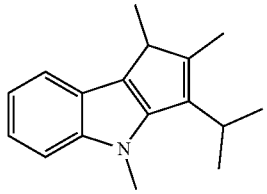 [SMILES: CC1=C(C(C)C)c2c(c3ccccc3n2C)C1C]

To 23.0 ml of 0.93M (21.4 mmol) adduct of isopropylmagnesium chloride with LiCl in THF 260 mg (1.94 mmol) of ZnCl₂ and 3.88 ml of 1.0M (3.88 mmol) trimethylsilylmethylmagnesium chloride in ether were subsequently added. The obtained solution was stirred for 30 min at room temperature, then cooled to 0° C. followed by addition of 8.97 g (45.0 mmol) of 2,3,4-trimethyl-1,4-dihydrocyclopenta[b]indol-3(2H)-one (as prepared above). The reaction mixture was refluxed for 2 h and then poured into 100 ml of saturated NH₄Cl followed by addition of 10 ml of 5% HCl. The aqueous phase was extracted with 3×70 ml of ether, the combined organic extract was dried over Na₂SO₄ and then evaporated to dryness. The residue was purified by flash chromatography on silica gel 60 (40-63 urn; eluent: hexane). Yield 2.74 g (59%) of the title compound as a yellow oil. The obtained product had ca.70% purity, and the major impurity was found to be 1,2,4-trimethyl-3-(propan-2-ylidene)-1,2,3,4-tetrahydrocyclopenta[b]indole.

¹H NMR (CDCl₃, 400 MHz): δ 7.53 (d, J=4.5 Hz, 1H), 7.32 (dd, J=8.0 Hz, J=5.3 Hz, 1H), 7.06-7.14 (m, 2H), 3.93 (s, 3H), 3.20-3.33 (m, 1H), 3.13 (q, J=7.6 Hz, 1H), 2.10 (s, 3H), 1.39 (d, J=7.1 Hz, 6H), 1.35 (d, J=7.5 Hz, 3H).

(η⁵-3-Isopropyl-1,2,4-trimethylcyclopenta[b]indolyl)titanium(IV) trichloride

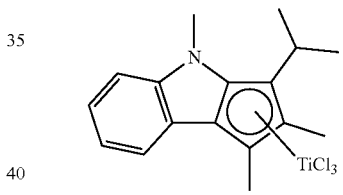

To a solution of 2.74 g (11.4 mmol) of 3-isopropyl-1,2,4-trimethyl-1,4-dihydrocyclopenta[b]indole in 200 ml of THF 3.02 ml of 2.5M (7.55 mmol) n-butyllithium in hexanes was added at −50° C. The obtained solution was stirred for 1 h at room temperature, cooled to −80° C. and 1.97 g (7.55 mmol) of tris(isopropoxy)titanium chloride was added. The reaction mixture was stirred overnight at room temperature and then evaporated to dryness. The crude (η⁵-3-Isopropyl-1,2,4-trimethylcyclopenta[b]indolyl)triisopropoxytitanium(IV) was dissolved in 200 ml of dry toluene and 6.34 g (37.6 mmol) of SiCl₄ was added. The obtained suspension was stirred overnight at 60° C. and then evaporated to dryness. To the residue 300 ml of dichloromethane was added and the obtained suspension was filtered through a pad of Celite 503. The filtrate was evaporated to dryness and the crude product was re-crystallized twice from 100 ml of methylcyclohexane. Yield 2.20 g (74%) of a dark violet powder.

¹H NMR (CDCl₃, 400 MHz): δ 7.95 (d, J=7.8 Hz, 1H), 7.42-7.55 (m, 1H), 7.20-7.41 (m, 2H), 4.02 (s, 3H), 3.66-3.83 (m, 1H), 2.82 (s, 3H), 2.63 (s, 3H), 1.57 (d, J=7.2 Hz, 3H), 1.48 (d, J=7.1 Hz, 3H).

Dimethyl(η⁵-3-isopropyl-1,2,4-trimethylcyclopenta[b]indolyl)[2-(2,6-difluorophenyl)-2,3-dihydro-1H-isoindol-1-ylidene]titanamine

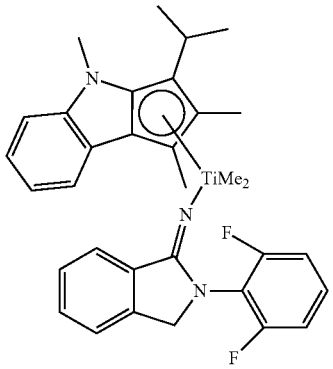

The described general synthesis for dichloro(η⁵-cyclopenta[b]indolyl/cyclopenta[6]benzofuranyl) titanium amidinates was used starting from (η⁵-3-isopropyl-1,2,4-trimethylcyclopenta[b]indolyl)titanium(IV) trichloride and 2-(2,6-difluorophenyl)isoindolin-1-imine. The respective dichloro(η⁵-cyclopenta[b]indolyl titanium amidinate complex was not isolated in analytically pure form and was used as is for the following methylation reaction. For the latter reaction, the described general synthesis for dimethyl(η⁵-cyclopenta[b]indolyl/cyclopenta[b]benzofuranyl) titanium amidinates (vide supra) was used. Yield: 211 mg (13% over two stages).

¹H NMR (C₆D₆, 400 MHz): δ 7.81 (d, J=7.7 Hz, 1H), 7.17-7.22 (m, 1H), 6.94-7.14 (m, 4H), 6.74-6.85 (m, 2H), 6.56-6.69 (m, 3H), 4.27 (d, J=16.3 Hz, 1H), 4.17 (d, J=16.3 Hz, 1H), 3.30 (s, 3H), 3.02-3.17 (m, 1H), 2.40 (s, 3H), 2.10 (s, 3H), 1.20 (d, J=7.2 Hz, 3H), 1.17 (d, J=7.2 Hz, 3H), 0.53 (s, 3H), 0.49 (s, 3H).

Synthesis of CPD7M

2-Methyl-4-phenyl-1,4-dihydrocyclopenta[b]indol-3(2H)-one

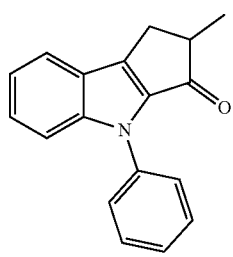 [SMILES: CC1Cc2c(n(-c3ccccc3)c3ccccc23)C1=O]

To a solution of 19.3 g (100 mmol) of N-phenylindole in 200 ml of THF 40.0 ml of 2.5 M (100 mmol) n-butyllithium in hexanes was added at −10° C. This mixture was stirred for 1 h at this temperature, then cooled to −30° C., followed by addition of a solution of 15.0 g (110 mmol) of ZnCl₂ in 300 ml of THF. The resulting mixture was warmed to room temperature and stirred for 30 min, then 1.16 g (1.00 mmol) of Pd(PPh₃)₄ and 11.5 g (110 mmol) of methacryloyl chloride were added. After 2 h of stirring the reaction mixture was poured into ice-cold water, the organic phase was separated, and the aqueous layer was extracted with 3×100 ml of ethyl acetate. The combined organic extract was dried over Na₂SO₄ and then evaporated to dryness. The residue was dissolved in 1000 ml of dichloromethane, and to the obtained solution 1 ml of methanesulfonic acid was added. The resulting mixture was stirred for 12 h at room temperature, then poured into 1 liter of cold water. The crude product was extracted with 3×300 ml of diethyl ether, the combined extract was passed through a thin pad of silica gel 60 (40-63 urn), and the obtained filtrate was evaporated to dryness. The crude product was purified by flash chromatography on silica gel 60 (40-63 urn, eluent: hexane/ethyl acetate=10:1, vol.). Yield: 5.96 g (23%) of a yellow solid.

¹H NMR (CDCl₃, 400 MHz): δ 7.75 (d, J=8.0 Hz, 1H), 7.48-7.58 (m, 5H), 7.35-7.43 (m, 2H), 7.20-7.27 (m, 1H), 3.40 (dd, J=16.9, 6.5 Hz, 1H), 3.04-3.15 (m, 1H), 2.73 (dd, J=16.9, 2.3 Hz, 1H), 1.39 (d, J=7.4 Hz, 3H).

2,3-Dimethyl-4-phenyl-1,4-dihydrocyclopenta[6]indole

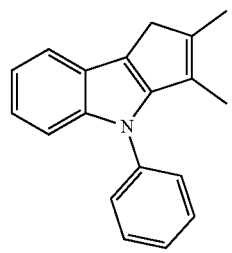 [SMILES: CC1=C(C)c2c(c3ccccc3n2-c2ccccc2)C1]

To a solution of 3.33 g (12.7 mmol) of 2-methyl-4-phenyl-1,4-dihydrocyclopenta[b]indol-3(2H)-one in 100 ml of THF 7.10 ml of 2.7 M (19.1 mmol) MeMgBr in ether was added. The resulting mixture was stirred overnight at 65° C., then accurately poured into ice-cold 5% HCl. The organic phase was separated, and the aqueous layer was extracted with 3×100 ml of ethyl acetate. The combined organic extract was dried over Na₂SO₄ and then evaporated to dryness. The crude product was purified by flash chromatography on silica gel 60 (40-63 urn, eluent: hexane). Yield: 2.31 g (70%) of a yellow oil.

¹H NMR (CDCl₃, 400 MHz): δ 7.49-7.59 (m, 3H), 7.40-7.49 (m, 3H), 7.20 (d, J=8.2 Hz, 1H), 7.14 (t, J=7.5 Hz, 1H), 7.00-7.07 (m, 1H), 3.17-3.30 (m, 2H), 2.11 (s, 3H), 1.64-1.76 (m, 3H).

(η⁵-2,3-Dimethyl-4-phenylcyclopenta[b]indolyl)titanium(IV) trichloride

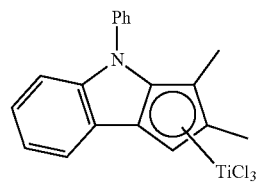

To a solution of 2.31 g (8.90 mmol) of 2,3-dimethyl-4-phenyl-1,4-dihydrocyclopenta[b]indole in 200 ml of THF 3.56 ml of 2.5 M (8.90 mmol) n-butyllithium in hexanes was added at −50° C. The obtained solution was stirred for 1 h at room temperature, then cooled to −80° C., and 2.32 g (8.90 mmol) of tris(isopropoxy)titanium chloride was added. The reaction mixture was stirred overnight at room temperature and then evaporated to dryness. The crude (η⁵-2,3-dimethyl-4-phenylcyclopenta[b]indolyl)triisopropoxytitanium(IV) was dissolved in 200 ml of dry toluene, and 7.57 g (44.5 mmol) of SiCl₄ was added. The obtained suspension was stirred overnight at 60° C. and then evaporated to dryness. To the residue 300 ml of dichloromethane was added, and the obtained suspension was filtered through a pad of Celite 503. The filtrate was evaporated to dryness, and the crude product was re-crystallized from 170 ml of methylcyclohexane. Yield: 3.20 g (87%) of a dark violet powder.

¹H NMR (CDCl₃, 400 MHz): δ 7.89 (d, J=7.8 Hz, 1H), 7.48-7.78 (m, 5H), 7.36-7.48 (m, 1H), 7.24-7.36 (m, 2H), 6.95 (s, 1H), 2.58 (s, 3H), 2.28 (s, 3H).

Dichloro[(η⁵-2,3-dimethyl-4-phenylcyclopenta[b]indolyl)][2-(2,6-difluorophenyl)-2,3-dihydro-1H-isoindol-1-ylidene]titanamine

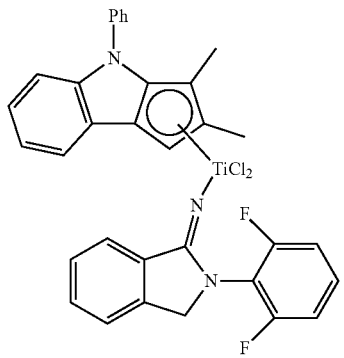

The described general synthesis for dichloro(η⁵-cyclopenta[b]indolyl/cyclopenta[b]benzofuranyl) titanium amidinates (vide supra) was used starting from (η⁵-2,3-dimethyl-4-phenylcyclopenta[b]indolyl)titanium(IV) trichloride and 2-(2,6-difluorophenyl)isoindolin-1-imine. Yield: 1.20 g (54%).

¹H NMR (CDCl₃, 400 MHz): δ 7.48 (d, J=6.4 Hz, 4H), 7.51 (d, J=7.1 Hz, 3H), 7.41 (s, 3H), 7.10 (m, 2H), 6.99 (br.s., 3H), 6.38 (s, 1H), 4.79 (s, 2H), 2.16 (s, 3H), 1.95 (s, 3H).

Dimethyl[(η⁵-2,3-dimethyl-4-phenylcyclopenta[b]indolyl)][2-(2,6-difluorophenyl)-2,3-dihydro-1H-isoindol-1-ylidene]titanamine

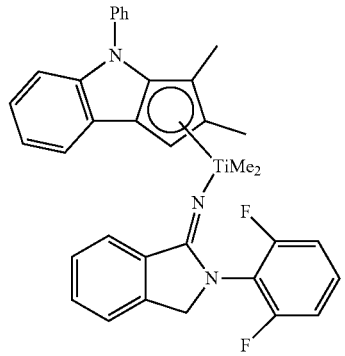

The described general synthesis for dimethyl(η⁵-cyclopenta[b]indolyl/cyclopenta[b]benzofuranyl) titanium amidinates (vide supra) was used starting from dichloro[(η⁵-2,3-dimethyl-4-phenylcyclopenta[b]indolyl)][2-(2,6-difluorophenyl)-2,3-dihydro-1H-isoindol-1-ylidene]titanamine. Yield: 672 mg (59%).

¹H NMR (C₆D₆, 400 MHz): δ 7.68-7.79 (m, 1H), 7.62 (d, J=7.1 Hz, 1H), 7.35 (d, J=7.5 Hz, 2H), 7.21-7.29 (m, 1H), 6.97-7.15 (m, 7H), 6.79 (d, J=7.3 Hz, 1H), 6.51-6.67 (m, 3H), 6.17 (s, 1H), 4.22 (s, 2H), 1.89 (s, 3H), 1.86 (s, 3H), 0.48 (s, 3H), 0.46 (s, 3H).

Synthesis of CPD8M 1,2-Dimethyl-4-phenyl-1,4-dihydrocyclopenta[b]indol-3(2H)-one

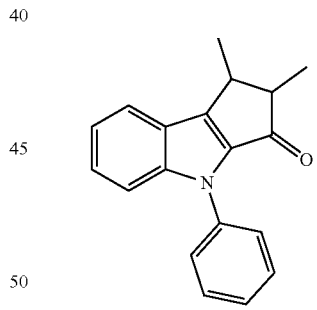

To a solution of 19.3 g (100 mmol) of N-phenylindole in 200 ml of THF 40.0 ml of 2.5 M (100 mmol) n-butyllithium in hexanes was added at −10° C. The formed mixture was stirred for 1 h at this temperature, then cooled to −30° C., followed by addition of a solution of 15.0 g (110 mmol) of ZnCl₂ in 300 ml of THF. The resulting mixture was warmed to room temperature and stirred for 30 min, then 1.16 g (1.00 mmol) of Pd(PPh₃)₄ and 13.0 g (110 mmol) of trans-2-methyl-2-butenoyl chloride were added. After 2 h of stirring the reaction mixture was poured into ice-cold water, the organic phase was separated, and the aqueous layer was extracted with 3×100 ml of ethyl acetate. The combined organic extract was dried over Na₂SO₄ and then evaporated to dryness. The residue was dissolved in 1000 ml of dichloromethane, and to the obtained solution 1 ml of methanesulfonic acid was added. The resulting mixture was stirred for 12 h at room temperature, then poured into 1 liter of water. The crude product was extracted with 3×300 ml of diethyl ether. The combined extract was passed through a thin pad of silica gel 60 (40-63 urn), and the obtained filtrate was evaporated to dryness. The crude product was purified by flash chromatography on silica gel 60 (40-63 urn, eluent: hexane/ethyl acetate=10:1, vol.). Yield: 20.0 g (73%) of a yellow oil.

$^1$H NMR (CDCl$_3$, 400 MHz): δ 7.75-7.82 (m, 1H), 7.47-7.59 (m, 5H), 7.34-7.42 (m, 2H), 7.21-7.27 (m, 1H), 3.65-3.75 (m, 1H), 3.16-3.24 (m, 1H), 3.10-3.16 (m, 1H), 2.60 (qd, J=7.5, 2.6 Hz, 1H), 1.59 (d, J=7.1 Hz, 3H), 1.42 (d, J=7.3 Hz, 3H), 1.38 (d, J=7.4 Hz, 3H), 1.28 (d, J=7.7 Hz, 3H).

1,2,3-Trimethyl-4-phenyl-1,4-dihydrocyclopenta[b]indole

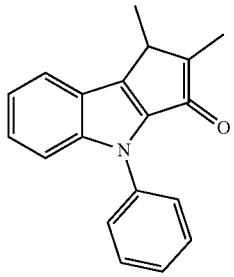

To a solution of 4.13 g (15.0 mmol) of 1,2-dimethyl-4-phenyl-1,4-dihydrocyclopenta[b]indol-3(2H)-one in 100 ml of THF 8.30 ml of 2.7 M (22.0 mmol) of MeMgBr in ether was added. The resulting mixture was stirred overnight at 65° C. and then accurately poured into ice-cold 5% HCl. The organic phase was separated, and the aqueous layer was extracted with 3×100 ml of ethyl acetate. The combined organic extract was dried over Na$_2$SO$_4$ and then evaporated to dryness. The crude product was purified by flash chromatography on silica gel 60 (40-63 urn, eluent: hexane). Yield: 3.00 g (73%) of an yellow oil.

$^1$H NMR (CDCl$_3$, 400 MHz): δ 7.57 (d, J=7.8 Hz, 1H), 7.48-7.54 (m, 2H), 7.40-7.48 (m, 3H), 7.20 (d, J=8.2 Hz, 1H), 7.10-7.17 (m, 1H), 6.99-7.06 (m, 1H), 3.26 (qd, J=7.5, 1.3 Hz, 1H), 1.96-2.05 (m, 3H), 1.69 (s, 3H), 1.41 (d, J=7.5 Hz, 3H).

(η$^5$-1,2,3-Trimethyl-4-phenylcyclopenta[b]indolyl)titanium(IV) trichloride

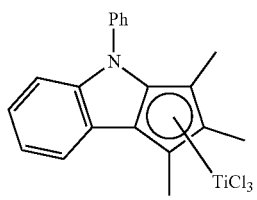

To a solution of 3.00 g (11.0 mmol) of 1,2,3-trimethyl-4-phenyl-1,4-dihydrocyclopenta[b]indole in 200 ml of THF 4.39 ml of 2.5 M (11.0 mmol) n-butyllithium in hexanes was added at −50° C. The obtained solution was stirred for 1 h at room temperature, then cooled to −80° C., and 2.86 g (11.0 mmol) of tris(isopropoxy)titanium chloride was added. The reaction mixture was stirred overnight at room temperature and then evaporated to dryness. The crude (η5-1,2,3-Trimethyl-4-phenylcyclopenta[b]indolyl)triisopropoxytitanium(IV) was dissolved in 200 ml of dry toluene, and 9.32 g (54.9 mmol) of SiCl$_4$ was added. The obtained suspension was stirred overnight at 60° C. and then evaporated to dryness. To the residue 300 ml of dichloromethane was added, and the obtained suspension was filtered through a pad of Celite 503. The filtrate was evaporated to dryness, and the crude product was re-crystallized from 170 ml of methylcyclohexane. Yield: 4.60 g (98%) of a dark violet powder.

$^1$H NMR (CDCl$_3$, 400 MHz): δ 7.94 (d, J=7.8 Hz, 1H), 7.45-7.75 (m, 5H), 7.41 (dd, J=8.2, 7.4 Hz, 1H), 7.32 (t, J=7.5 Hz, 1H), 7.27 (s, 1H), 2.89 (s, 3H), 2.49 (s, 3H), 2.31 (s, 3H).

Dichloro[(η$^5$-1,2,3-trimethyl-4-phenylcyclopenta[b]indolyl)][2-(2,6-difluorophenyl)-2,3-dihydro-1H-isoindol-1-ylidene]titanamine

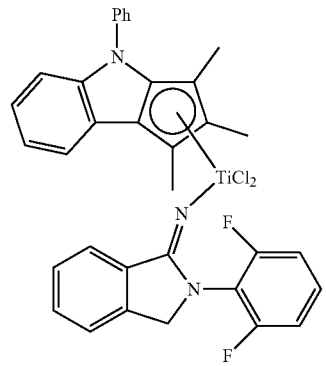

The described general synthesis for dichloro(η$^5$-cyclopenta[b]indolyl/cyclopenta[b]benzofuranyl) titanium amidinates (vide supra) was used starting from (η$^5$-1,2,3-trimethyl-4-phenylcyclopenta[b]indolyl)titanium(IV) trichloride and 2-(2,6-difluorophenyl)isoindolin-1-imine. Yield: 1.43 g (64%).

$^1$H NMR (CDCl$_3$, 400 MHz): δ 7.66 (d, J=1.7 Hz, 1H), 7.44-7.59 (m, 5H), 7.22-7.42 (m, 5H), 6.92-7.20 (m, 6H), 4.64-4.87 (m, 2H), 2.41 (s, 3H), 2.05 (s, 3H), 1.99 (s, 3H).

Dimethyl[(η⁵-1,2,3-trimethyl-4-phenylcyclopenta[b]
indolyl)][2-(2,6-difluorophenyl)-2,3-dihydro-1H-
isoindol-1-ylidene]titanamine

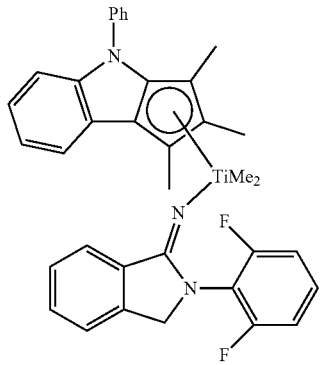

The described general synthesis for dimethyl(η⁵-cyclopenta[b]indolyl/cyclopenta[b]benzofuranyl) titanium amidinates (vide supra) was used starting from dichloro[(η⁵-1,2,3-trimethyl-4-phenylcyclopenta[b]indolyl)][2-(2,6-difluorophenyl)-2,3-dihydro-1H-isoindol-1-ylidene]titanamine. Yield: 976 mg (72%).

¹H NMR (C₆D₆, 400 MHz): δ 7.74-7.82 (m, 1H), 7.61 (d, J=7.4 Hz, 1H), 7.42 (d, J=8.2 Hz, 2H), 7.24-7.31 (m, 1H), 6.96-7.21 (m, 7H), 6.80 (d, J=7.0 Hz, 1H), 6.50-6.69 (m, 3H), 4.10-4.35 (m, 2H), 2.38 (s, 3H), 1.85-1.98 (m, 3H), 1.78 (s, 3H), 0.47 (s, 3H), 0.44 (s, 3H).

Synthesis of CPD9M 1,2-Dimethyl-3,4-diphenyl-1,4-dihydrocyclopenta[b]
indole

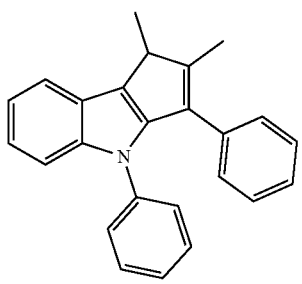 [SMILES: CC1=C(c2ccccc2)c2c(c3ccccc3n2-c2ccccc2)C1C]

To 6.11 ml of 2.7 M (16.5 mmol) phenylmagnesium bromide in ether 700 mg (16.5 mmol) of LiCl, 310 mg (2.30 mmol) of anhydrous ZnCl₂, and 4.60 ml of 1.0 M (4.60 mmol) trimethylsilylmethylmagnesium chloride in ether were subsequently added. The obtained solution was stirred for 30 min at room temperature, then cooled to 0° C., followed by addition of 100 ml of THF and 4.13 g (15.0 mmol) of 1,2-dimethyl-4-phenyl-1,4-dihydrocyclopenta[b]-indol-3(2H)-one. The reaction mixture was refluxed for 2 h and then poured into 100 ml of saturated NH₄Cl followed by addition of 10 ml of 5% HCl. The aqueous phase was extracted with 3×70 ml of diethyl ether, the combined organic extract was dried over Na₂SO₄ and then evaporated to dryness. The residue was purified by flash chromatography on silica gel 60 (40-63 urn, eluent: hexane).

Yield: 2.60 g (52%) of an off-white solid.

¹H NMR (CDCl₃, 400 MHz): δ 7.64 (d, J=7.7 Hz, 1H), 7.33 (d, J=8.2 Hz, 1H), 7.18 (t, J=7.4 Hz, 1H), 7.00-7.14 (m, 9H), 6.92-6.99 (m, 2H), 3.45 (q, J=7.6 Hz, 1H), 2.09 (s, 3H), 1.54 (d, J=7.5 Hz, 3H).

(η⁵-1,2-Dimethyl-3,4-diphenylcyclopenta[b]indolyl)
titanium(IV) trichloride

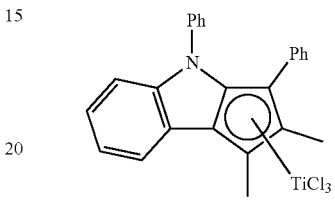

To a solution of 2.60 g (7.80 mmol) of 1,2-dimethyl-3,4-diphenyl-1,4-dihydrocyclopenta[b]indole in 200 ml of THF 3.10 ml of 2.5 M (7.80 mmol) n-butyllithium in hexanes was added at −50° C. The obtained solution was stirred for 1 h at room temperature, then cooled to −80° C., and 2.02 g (7.80 mmol) of tris(isopropoxy)titanium chloride was added. The reaction mixture was stirred overnight at room temperature and then evaporated to dryness. The crude (η5-1,2-Dimethyl-3,4-diphenylcyclopenta[b]indolyl)triisopropoxytitanium(IV) was dissolved in 200 ml of dry toluene, and 6.58 g (38.8 mmol) of SiCl₄ was added. The obtained suspension was stirred overnight at 60° C. and then evaporated to dryness. To the residue 300 ml of dichloromethane was added, and the obtained suspension was filtered through a pad of Celite 503. The filtrate was evaporated to dryness, and the crude product was re-crystallized from 170 ml of methylcyclohexane. Yield: 2.85 g (75%) of a dark violet powder. 15 ¹H NMR (CDCl₃, 400 MHz): δ 8.02 (d, J=8.2 Hz, 1H), 7.38-7.51 (m, 1H), 7.29-7.38 (m, 3H), 7.04-7.28 (m, 9H), 3.00 (s, 3H), 2.65 (s, 3H).

Dichloro[(η⁵-1,2-dimethyl-3,4-diphenylcyclopenta
[b]indolyl)][2-(2,6-difluorophenyl)-2,3-dihydro-1H-
isoindol-1-ylidene]titanamine

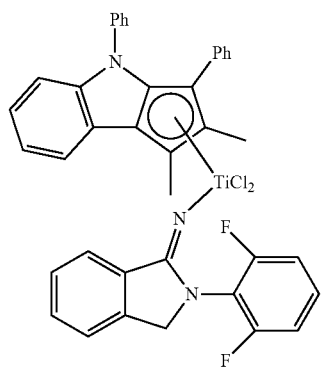

The described general synthesis for dichloro(η⁵-cyclopenta[b]indolyl/cyclopenta[b]benzofuranyl) titanium amidinates (vide supra) was used starting from $\eta^5$-1,2-dimethyl-3,4-diphenylcyclopenta[b]indolyl)titanium(IV) trichloride and 2-(2,6-difluorophenyl)isoindolin-1-imine.

Yield: 1.89 g (88%).

$^1$H NMR (CDCl$_3$, 400 MHz): δ 7.76-7.89 (m, 1H), 7.41-7.50 (m, 1H), 7.20-7.39 (m, 3H), 6.96-7.20 (m, 13H), 6.91 (t, J=7.2 Hz, 3H), 4.66-4.87 (m, 2H), 2.54 (s, 3H), 2.20 (s, 3H).

Dimethyl[($\eta^5$-1,2-dimethyl-3,4-diphenylcyclopenta[b]indolyl)][2-(2,6-difluorophenyl)-2,3-dihydro-1H-isoindol-1-ylidene]titanamine

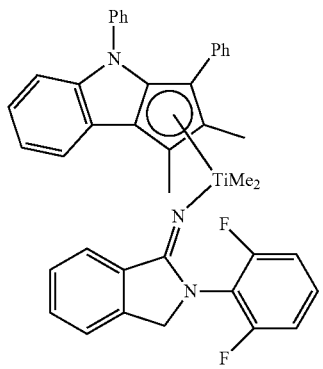

The described general synthesis for dimethyl($\eta^5$-cyclopenta[b]indolyl/cyclopenta[b]benzofuranyl) titanium amidinates (vide supra) was used starting from dichloro[($\eta^5$-1,2-dimethyl-3,4-diphenylcyclopenta[b]indolyl)][2-(2,6-difluorophenyl)-2,3-dihydro-1H-isoindol-1-ylidene]titanamine. Yield: 1.21 g (67%).

$^1$H NMR (C$_6$D$_6$, 400 MHz): δ 7.83-7.93 (m, 1H), 6.98-7.28 (m, 9H), 6.81-6.98 (m, 7H), 6.75 (d, J=1.4 Hz, 1H), 6.50-6.67 (m, 3H), 4.20-4.39 (m, 1H), 4.04-4.20 (m, 1H), 2.48-2.57 (m, 3H), 2.02-2.16 (m, 3H), 0.64 (s, 3H), 0.63 (s, 3H).

Synthesis of CPD10M

2-Methyl-3,4-diphenyl-1,4-dihydrocyclopenta[b]indole

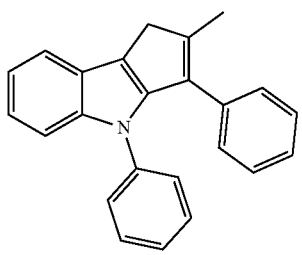 [SMILES: CC1=C(c2ccccc2)c2c(c3ccccc3n2-c2ccccc2)C1]

To 5.55 ml of 2.7 M (15.0 mmol) phenylmagnesium bromide in ether 700 mg (16.5 mmol) of LiCl, 310 mg (2.30 mmol) of ahydrous ZnCl$_2$, and 4.60 ml of 1.0 M (4.60 mmol) trimethylsilylmethylmagnesium chloride in ether were subsequently added. The obtained solution was stirred for 30 min at room temperature, then cooled to 0° C., followed by addition of 100 ml of THF and 2.63 g (10.0 mmol) of 2-methyl-4-phenyl-1,4-dihydrocyclopenta[b]indol-3(2H)-one. The reaction mixture was refluxed for 2 h and then poured into 100 ml of saturated NH$_4$Cl followed by addition of 10 ml of 5% HCl. The aqueous phase was extracted with 3×70 ml of diethyl ether, the combined organic extract was dried over Na$_2$SO$_4$ and then evaporated to dryness. The residue was purified by flash chromatography on silica gel 60 (40-63 urn, eluent: hexane). Yield: 2.18 g (68%) of a white solid.

$^1$H NMR (CDCl$_3$, 400 MHz): δ 7.61 (d, J=7.8 Hz, 1H), 7.33 (d, J=8.2 Hz, 1H), 7.14-7.21 (m, 1H), 7.00-7.14 (m, 9H), 6.93-6.98 (m, 2H), 3.43 (s, 2H), 2.19 (s, 3H).

($\eta^5$-2-Methyl-3,4-diphenylcyclopenta[b]indolyl)titanium(IV) trichloride

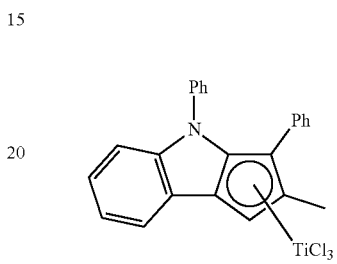

To a solution of 2.18 g (6.80 mmol) of 2-methyl-3,4-diphenyl-1,4-dihydrocyclopenta[b]indole in 200 ml of THF 2.71 ml of 2.5 M (6.80 mmol) n-butyllithium in hexanes was added at −50° C. The obtained solution was stirred for 1 h at room temperature, then cooled to −80° C., and 1.77 g (6.80 mmol) of tris(isopropoxy)titanium chloride was added. The reaction mixture was stirred overnight at room temperature and then evaporated to dryness. The crude ($\eta^5$-2-Methyl-3,4-diphenylcyclopenta[b]indolyl)triisopropoxytitanium(IV) was dissolved in 200 ml of dry toluene, and 5.76 g (33.9 mmol) of SiCl$_4$ was added. The obtained suspension was stirred overnight at 60° C. and then evaporated to dryness. To the residue 350 ml of dichloromethane was added, and the obtained suspension was filtered through a pad of Celite 503. The filtrate was evaporated to dryness, and the crude product was re-crystallized from 190 ml of methylcyclohexane. Yield: 3.20 g (quant.) of a dark violet powder.

$^1$H NMR (CDCl$_3$, 400 MHz): δ 7.96 (d, J=7.9 Hz, 1H), 7.38-7.50 (m, 1H), 7.29-7.38 (m, 3H), 7.03-7.29 (m, 10H), 2.73 (s, 3H).

Dichloro[($\eta^5$-2-methyl-3,4-diphenylcyclopenta[b]indolyl)][2-(2,6-difluorophenyl)-2,3-dihydro-1H-isoindol-1-ylidene]titanamine

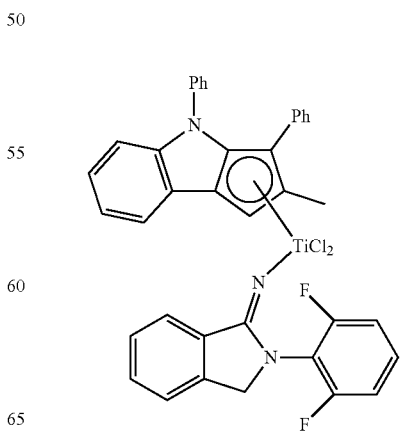

The described general synthesis for dichloro(η⁵-cyclopenta[b]indolyl/cyclopenta[b]benzofuranyl) titanium amidinates (vide supra) was used starting from (η⁵-2-methyl-3,4-diphenylcyclopenta[b]indolyl)titanium(IV) trichloride and 2-(2,6-difluorophenyl)isoindolin-1-imine. Yield: 1.28 g (59%).

¹H NMR (CDCl₃, 400 MHz): δ 7.71 (d, J=7.8 Hz, 1H), 7.46 (t, J=7.4 Hz, 1H), 7.38 (d, J=7.5 Hz, 1H), 7.27-7.36 (m, 1H), 6.96-7.22 (m, 14H), 6.87-6.96 (m, 2H), 6.83 (d, J=7.8 Hz, 1H), 6.55 (s, 1H), 4.88 (d, J=17.3 Hz, 1H), 4.75 (d, J=17.3 Hz, 1H), 2.28 (s, 3H).

Dimethyl[(η⁵-2-methyl-3,4-diphenylcyclopenta[b]indolyl)][2-(2,6-difluorophenyl)-2,3-dihydro-1H-isoindol-1-ylidene]titanamine

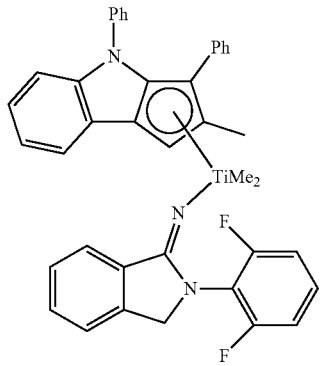

The described general synthesis for dimethyl(η⁵-cyclopenta[b]indolyl/cyclopenta[b]benzofuranyl) titanium amidinates (vide supra) was used starting from dichloro[(η⁵-2-methyl-3,4-diphenylcyclopenta[b]indolyl)][2-(2,6-difluorophenyl)-2,3-dihydro-1H-isoindol-1-ylidene]titanamine. Yield: 1.15 g (94%).

¹H NMR (C₆D₆, 400 MHz): δ 7.83 (d, J=7.1 Hz, 1H), 7.23 (d, J=8.1 Hz, 1H), 7.17-7.20 (m, 1H), 7.08-7.14 (m, 1H), 6.79-7.07 (m, 13H), 6.75 (d, J=7.3 Hz, 1H), 6.52-6.68 (m, 3H), 6.50 (s, 1H), 4.30 (d, J=16.5 Hz, 1H), 4.09 (d, J=16.5 Hz, 1H), 2.23 (s, 3H), 0.71 (s, 3H), 0.65 (s, 3H).

Synthesis of CPD11M 2,4-Dimethyl-3-phenyl-1,4-dihydrocyclopenta[b]indole

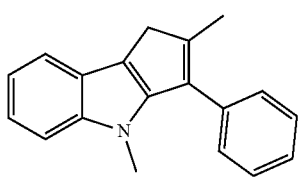 [SMILES: CC1=C(c2ccccc2)c2c(c3ccccc3n2C)C1]

To 14.8 ml of 2.7 M (40.0 mmol) phenylmagnesium bromide in ether 1.70 g (40.0 mmol) of LiCl, 630 mg (4.70 mmol) of anhydrous ZnCl₂, and 9.30 ml of 1.0 M (9.30 mmol) trimethylsilylmethylmagnesium chloride in ether were subsequently added. The obtained solution was stirred for 30 min at room temperature, then cooled to 0° C., followed by addition of 100 ml of THF and 6.23 g (31.0 mmol) of 2,4-dimethyl-1,4-dihydrocyclopenta[b]indol-3(2H)-one. The reaction mixture was refluxed for 2 h and then poured into 100 ml of saturated NH₄Cl followed by addition of 10 ml of 5% HCl. The aqueous phase was extracted with 3×70 ml of ether, the combined organic extract was dried over Na₂SO₄ and then evaporated to dryness. The residue was purified by flash chromatography on silica gel 60 (40-63 um, eluent: hexane). Yield: 7.20 g (90%) of a white solid.

¹H NMR (CDCl₃, 400 MHz): δ 7.51-7.59 (m, 1H), 7.43-7.51 (m, 2H), 7.33-7.43 (m, 2H), 7.17-7.32 (m, 2H), 7.04-7.16 (m, 2H), 3.48 (s, 3H), 3.34 (s, 2H), 2.11 (s, 3H).

(η⁵-2,4-Dimethyl-3-phenylcyclopenta[b]indolyl)titanium(IV) trichloride

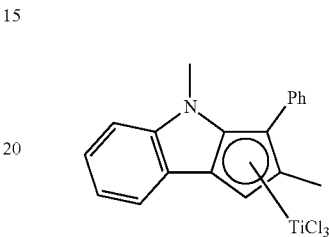

To a solution of 7.20 g (27.7 mmol) of 2,4-dimethyl-3-phenyl-1,4-dihydrocyclopenta[b]indole in 400 ml of THF 11.1 ml of 2.5 M (27.7 mmol) n-butyllithium in hexanes was added at −50° C. The obtained solution was stirred for 1 h at room temperature, then cooled to −80° C., and 7.22 g (27.7 mmol) of tris(isopropoxy)-titanium chloride was added. The reaction mixture was stirred overnight at room temperature and then evaporated to dryness. The crude (η⁵-2,4-Dimethyl-3-phenylcyclopenta[b]indolyl)triisopropoxytitanium(IV) was dissolved in 400 ml of dry toluene, and 23.5 g (138 mmol) of SiCl₄ was added. The obtained suspension was stirred overnight at 60° C. and then evaporated to dryness. To the residue 400 ml of dichloromethane was added, and the obtained suspension was filtered through a pad of Celite 503. The filtrate was evaporated to dryness, and the crude product was re-crystallized from 450 ml of methylcyclohexane. Yield: 11.6 g (quant.) of a dark violet powder.

¹H NMR (CDCl₃, 400 MHz): δ 7.92 (d, J=7.8 Hz, 1H), 7.67 (d, J=7.1 Hz, 2H), 7.43-7.60 (m, 4H), 7.26-7.36 (m, 2H), 6.98 (s, 1H), 3.66 (s, 3H), 2.63 (s, 3H).

Dichloro[(η⁵-2,4-dimethyl-3-phenylcyclopenta[b]indolyl)][2-(2,6-difluorophenyl)-2,3-dihydro-1H-isoindol-1-ylidene]titanamine

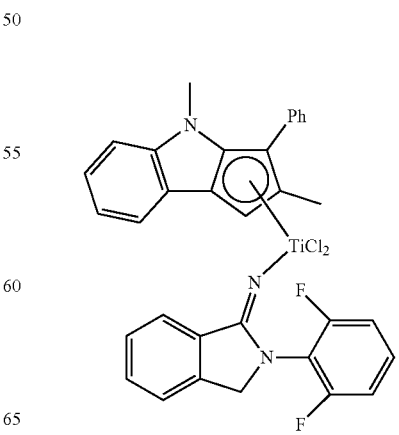

The described general synthesis for dichloro(η⁵-cyclopenta[b]indolyl/cyclopenta[b]benzofuranyl) titanium amidinates (vide supra) was used starting from (η⁵-2,4-dimethyl-3-phenylcyclopenta[b]indolyl)titanium(IV) trichloride and 2-(2,6-difluorophenyl)isoindolin-1-imine. Yield: 1.43 g (73%).

¹H NMR (CDCl₃, 400 MHz): δ 7.62 (d, J=7.8 Hz, 1H), 7.30-7.55 (m, 8H), 7.20-7.30 (m, 1H), 6.91-7.20 (m, 5H), 6.59 (d, J=7.4 Hz, 1H), 6.42 (s, 1H), 4.85 (d, J=17.1 Hz, 1H), 4.74 (d, J=17.2 Hz, 1H), 3.45 (s, 3H), 2.22 (s, 3H).

Dimethyl[(η⁵-2,4-dimethyl-3-phenylcyclopenta[/j]indolyl)][2-(2,6-difluorophenyl)-2,3-dihydro-1H-isoindol-1-ylidene]titanamine

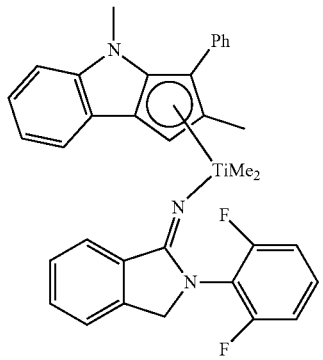

The described general synthesis for dimethyl(η⁵-cyclopenta[b]indolyl/cyclopenta[b]benzofuranyl) titanium amidinates (vide supra) was used starting from dichloro[(η⁵-2,4-dimethyl-3-phenylcyclopenta[b]indolyl)][2-(2,6-difluorophenyl)-2,3-dihydro-1H-isoindol-1-ylidene]titanamine. Yield: 770 mg (56%).

¹H NMR (C₆D₆, 400 MHz): δ 7.77 (d, J=7.7 Hz, 1H), 7.26-7.42 (m, 2H), 7.00-7.19 (m, 6H), 6.87-6.99 (m, 2H), 6.75 (d, J=7.8 Hz, 2H), 6.53-6.70 (m, 3H), 6.40 (s, 1H), 4.25 (d, J=16.4 Hz, 1H), 4.11 (d, J=16.4 Hz, 1H), 3.08 (s, 3H), 2.21 (s, 3H), 0.63 (s, 3H), 0.61 (s, 3H).

Synthesis of CPD12M

[η⁵-4-(3,5-Di-tert-butylphenyl)-1,2,3-trimethylcyclopenta[b]indolyl]titanium(IV) trichloride

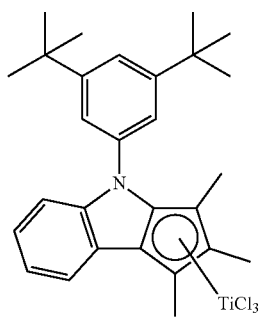

To a solution of 3.17 g (8.22 mmol) of 4-(3,5-di-tert-butylphenyl)-1,2,3-trimethyl-3,4-dihydrocyclopenta[b]indole in 150 ml of THF 3.30 ml of 2.5 M (8.22 mmol) n-butyllithium in hexanes was added at −50° C. The obtained solution was stirred for 1 h at room temperature, then cooled to −80° C., and 2.14 g (8.22 mmol) of tris(isopropoxy)titanium chloride was added. The reaction mixture was stirred overnight at room temperature and then evaporated to dryness. The crude [η⁵-4-(3,5-Di-tert-butylphenyl)-1,2,3-trimethylcyclopenta[b]indolyl]triisopropoxytitanium(IV) was dissolved in 100 ml of dry toluene, and 6.98 g (41.1 mmol) of SiCl₄ was added. The obtained suspension was stirred overnight at 60° C. and then evaporated to dryness. To the residue 150 ml of dichloromethane was added, and the obtained suspension was filtered through a pad of Celite 503. The filtrate was evaporated to dryness, and the crude product was re-crystallized from 100 ml of methylcyclohexane. Yield: 2.10 g (47%, ca.70% purity) of a purple powder.

¹H NMR (CDCl₃, 400 MHz): δ 7.94 (d, J=7.4 Hz, 1H), 7.69 (m, 1H), 7.51 (m, 1H), 7.36-7.46 (m, 2H), 7.28-7.35 (m, 2H), 2.88 (s, 3H), 2.49 (s, 3H), 2.32 (s, 3H), 1.36 (s, 18H).

Dichloro[η⁵-4-(3,5-di-tert-butylphenyl)-1,2,3-trimethylcyclopenta[b]indolyl][2-(2,6-difluorophenyl)-2,3-dihydro-1H-isoindol-1-ylidene]titanamine

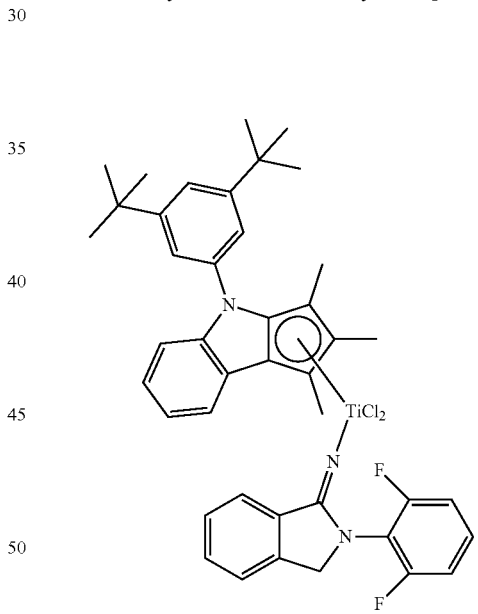

The described general synthesis for dichloro(η⁵-cyclopenta[b]indolyl/cyclopenta[b]benzofuranyl) titanium amidinates (vide supra) was used starting from η⁵-4-(3,5-di-tert-butylphenyl)-1,2,3-trimethylcyclopenta[b]indolyl]titanium(IV) trichloride and 2-(2,6-difluorophenyl)isoindolin-1-imine. Yield: 500 mg (36%).

¹H NMR (CDCl₃, 400 MHz): δ 7.67 (d, J=7.5 Hz, 1H), 7.46-7.51 (m, 2H), 7.26-7.43 (m, 6H), 7.12 (m, 2H), 6.96-7.09 (m, 3H), 4.86 (d, J=17.1 Hz, 1H), 4.74 (d, J=17.1 Hz, 1H), 2.35 (s, 3H), 2.05 (m, 6H), 1.35 (s, 18H).

Dimethyl[η⁵-4-(3,5-di-tert-butylphenyl)-1,2,3-trimethylcyclopenta[b]indolyl][2-(2,6-difluorophenyl)-2,3-dihydro-1H-isoindol-1-ylidene]titanamine

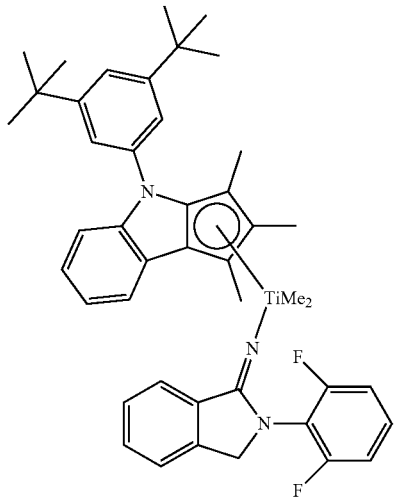

The described general synthesis for dimethyl(η⁵-cyclopenta[b]indolyl/cyclopenta[b]benzofuranyl) titanium amidinates (vide supra) was used starting from dichloro[η⁵-4-(3,5-di-tert-butylphenyl)-1,2,3-trimethylcyclopenta[b]indolyl][2-(2,6-difluorophenyl)-2,3-dihydro-1H-isoindol-1-ylidene]titanamine. Yield: 305 mg (64%).

¹H NMR (C₆D₆, 400 MHz): δ 7.79 (d, J=2.7 Hz, 1H), 7.63 (d, J=6.0 Hz, 3H), 7.43-7.55 (m, 2H), 7.13-7.22 (m, 2H), 7.01-7.11 (m, 2H), 6.75-6.86 (m, 1H), 6.50-6.67 (m, 3H), 4.18-4.32 (m, 2H), 2.32 (s, 3H), 2.10 (s, 3H), 1.80 (s, 3H), 1.28 (s, 18H), 0.60 (s, 3H), 0.36 (s, 3H).

Synthesis of CPD13M (η⁵-1,2,3-Tetramethylcyclopenta[b]indolyl)titanium(IV) trichloride

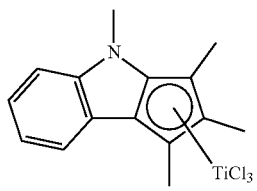

To a solution of 15.0 g (71.0 mmol) of 1,2,3,4-tetramethyl-1,4-dihydrocyclopenta[b]indole in 400 ml of THF 28.4 ml of 2.5 M (71.0 mmol) n-butyllithium in hexanes was added at −50° C. The obtained solution was stirred for 1 h at room temperature, then cooled to −80° C., and 18.5 g (71.0 mmol) of tris(isopropoxy)titanium chloride was added. The reaction mixture was stirred overnight at room temperature and then evaporated to dryness. The crude (η⁵-1,2,3-tetramethylcyclopenta[b]indolyl) titanium(IV)trissopropoxytitanium(IV) was dissolved in 400 ml of dry toluene, and 49.0 g (288 mmol) of SiCl₄ was added. The obtained suspension was stirred overnight at 60° C. and then evaporated to dryness. To the residue 500 ml of dichloromethane was added, and the obtained suspension was filtered through a pad of Celite 503. The filtrate was evaporated to dryness, and the crude product was re-crystallized from 450 ml of methylcyclohexane. Yield: 17.4 g (75%) of a dark violet powder.

¹H NMR (CD₂Cl₂, 400 MHz): δ 7.92-7.94 (m, 1H), 7.51-7.55 (m, 1H), 7.38-7.40 (m, 1H), 7.29-7.33 (m, 1H), 3.96 (s, 3H), 2.84 (s, 3H), 2.76 (s, 3H), 2.54 (s, 3H).

Dichloro[η⁵-(1,2,3,4-tetramethyl-cyclopenta[b]indolyl)][(2,6-difluorophenyl)(piperidin-1-yl)methylene]titanamine (IV)

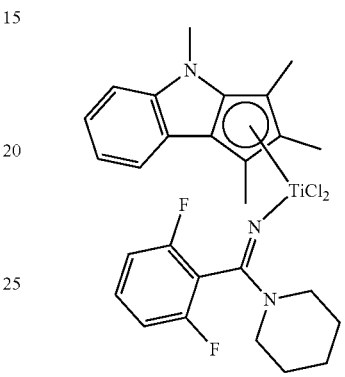

The described general synthesis for dichloro(η⁵-cyclopenta[b]indolyl/cyclopenta[b]benzofuranyl) titanium amidinates (vide supra) was used starting from (η⁵-1,2,3,4-tetramethylcyclopenta[b]indolyl)titanium(IV) trichloride and (2,6-difluorophenyl)-1-piperidin-1-ylmethanimine. Yield: 4.3 g (47%).

¹H NMR (CD₂Cl₂, 400 MHz): δ 7.72-7.74 (m, 1H), 7.31-7.41 (m, 3H), 7.08-7.12 (m, 1H), 6.96-7.02 (m, 2H), 3.78 (s, 3H), 3.38-3.53 (m, 2H), 3.15-3.18 (m, 2H), 2.46 (s, 3H), 2.41 (s, 3H), 2.21 (s, 3H), 1.66-1.76 (br.s, 2H), 1.51-1.64 (m, 4H).

Dimethyl[η⁵-(1,2,3,4-tetramethyl-cyclopenta[b]indolyl)][(2,6-difluorophenyl)(piperidin-1-yl)methylene]titanamine (IV)

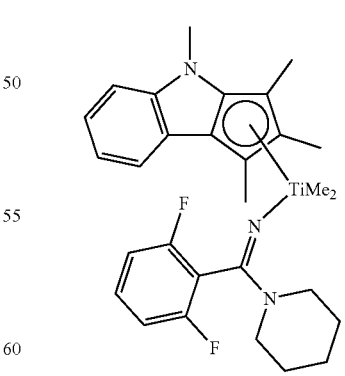

The described general synthesis for dichloro(η⁵-cyclopenta[b]indolyl/cyclopenta[b]benzofuranyl) titanium amidinates (vide supra) was used starting from dichloro[η⁵-(1,2,3,4-tetramethyl-cyclopenta[b]indolyl)][(2,6-difluorophenyl)(piperidin-1-yl)methylene]titanamine. Yield: 1.26 g (44%).

$^1$H NMR (C$_6$D$_6$, 400 MHz): δ 7.78 (d, J=7.7 Hz, 1H), 7.21-7.30 (m, 1H), 7.08-7.15 (m, 2H), 6.98 (d, J=8.3 Hz, 1H), 6.42-6.62 (m, 3H), 3.40-3.64 (m, 2H), 3.31 (s, 3H), 2.89 (m, 2H), 2.41 (s, 3H), 2.20 (s, 3H), 1.93 (s, 3H), 1.31 (m, 2H), 1.14 (m, 4H), 0.29 (s, 6H)

Synthesis of CPD14M

Dimethyl(η$^5$-1,2,3,4-tetramethylcyclopenta[b]indolyl)[2-(2,6-dimethylphenyl)-2,3-dihydro-1H-isoindol-1-ylidene]titanamine (IV)

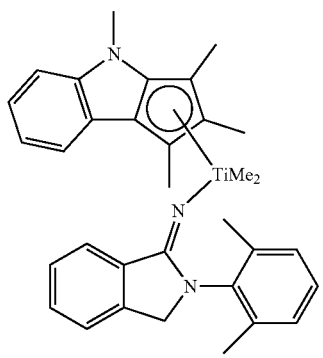

The described general synthesis for dichloro(η$^5$-cyclopenta[b]indolyl/cyclopenta[b]benzofuranyl) titanium amidinates was used starting from (η$^5$-1,2,3,4-Tetramethylcyclopenta[b]indolyl)titanium(IV) trichloride and 2-(2,6-dimethylphenyl)-isoindolin-1-imine. The respective dichloro(η$^5$-cyclopenta[b]indolyl titanium amidinate complex was not isolated in analytically pure form and was used as is for the following methylation reaction. For the latter reaction, the described general synthesis for dimethyl(η$^5$-cyclopenta[b]indolyl/cyclopenta[b]benzofuranyl) titanium amidinates (vide supra) was used. Yield: 1.70 g (15% over two stages).

$^1$H NMR (C$_6$D$_6$, 400 MHz): δ 7.79 (d, J=7.6 Hz, 1H), 7.64-7.73 (m, 1H), 7.24-7.32 (m, 1H), 7.10-7.17 (m, 3H), 6.91-7.04 (m, 5H), 4.03-4.18 (m, 2H), 3.29 (s, 3H), 2.33 (s, 3H), 2.15 (s, 3H), 2.12 (s, 3H), 2.11 (s, 3H), 1.78 (s, 3H), 0.21 (s, 3H), 0.16 (s, 3H).

Part II—Batch EPM/EPDM Co-Polymerizations (General Procedure)

The batch co-polymerizations were carried out in a 2-liter batch autoclave equipped with a double intermig and baffles. The reaction temperature was set on 90+/−3° C. (data shown in Tables 1, 2, 3 and 4) (120+/−3° C. for reactions in Table 5) and controlled by a Lauda Thermostat. The feed streams (solvents and monomers) were purified by contacting with various adsorption media to remove catalyst killing impurities such as water, oxygen and polar compounds as is known to those skilled in the art. During polymerisation the ethylene and propylene monomers were continuously fed to the gas cap of the reactor. The pressure of the reactor was kept constant by a back-pressure valve.

In an inert atmosphere of nitrogen, the reactor was filled with pentamethylheptane (PMH) (950 ml), MAO-10T (Crompton, 10 wt % in toluene) or TiBA, BHT (2,6-Di-tert-butyl-4-methylphenol) and, for the EPDM high ENB experiments, 5-ethylidene-2-norbornene (ENB). The reactor was heated to 90° C. (or 120° C. resp.), while stirring at 1350 rpm. The reactor was pressurized and conditioned under a determined ratio of ethylene, propylene and, for the EPDM/EPDM high ENB experiments, hydrogen (0.35 NL/h) was dosed additionally. After 15 minutes, the catalyst component and the borate co-catalyst when applicable were added into the reactor (0.02-0.14 µmol depending on catalyst productivity) and the catalyst vessel was rinsed with PMH (50 ml) subsequently. After 10 minutes of polymerization, the monomer flow was stopped and the solution was carefully dumped in an Erlenmeyer flask of 2 L, containing a solution of Irganox-1076 in iso-propanol and dried over night at 100° C. under reduced pressure. The polymers were analyzed for molecular-weights (SEC-IR) and composition (FT-IR).

The experimental conditions and results are given at the bottom of the tables.

1. Polymerization

TABLE 1

EPM 400/200 NL/h; 90° C. 7bar; MAO-10T

| Catalyst | Cat dosing | M-cont | C2 | C3 | Mn | Mw | Mw/Mn |
|---|---|---|---|---|---|---|---|
| CE1M | 0.05 | 0.58 | 38.7 | 61.3 | 176 | 480 | 2.7 |
| CPD2M | 0.1 | 0.5 | 23 | 77 | 169 | 347 | 2.1 |
| CPD3M | 0.2 | 4.2 | 26 | 74 | 79 | 210 | 2.6 |
| CPD1M | 0.1 | 8 | 19 | 81 | 129 | 369 | 2.8 |
| CPD13M | 0.05 | 0.2 | 42.9 | 57.1 | 269 | 635 | 2.4 |
| CPD14M | 0.05 | 0.3 | 41.7 | 58.3 | 354 | 711 | 2.0 |
| CPD4M | 0.1 | 0.6 | 33.5 | 66.5 | 288 | 635 | 2.2 |
| CPD5M | 0.1 | 0.6 | 34.5 | 65.5 | 253 | 547 | 2.2 |
| CPD9M | 0.1 | 0.6 | 32.3 | 67.7 | 315 | 696 | 2.2 |
| CPD10M | 0.1 | 0.5 | 35.6 | 64.4 | 300 | 675 | 2.3 |
| CPD8M | 0.1 | 0.4 | 32.4 | 67.6 | 240 | 509 | 2.1 |
| CPD7M | 0.1 | 0.7 | 36 | 64 | 200 | 470 | 2.4 |
| CPD11M | 0.07 | 0.5 | 37.4 | 62.6 | 255 | 566 | 2.2 |
| CPD12M | 0.05 | 0.3 | 33.6 | 66.4 | 239 | 522 | 2.2 |
| CPD6M | 0.05 | 0.5 | 33.9 | 66.1 | 405 | 840 | 2.1 |

MAO-10T = 450 micromoles/l; BHT/Al = 2; C3 = 400 Nl/h; C2 = 200 Nl/h; P = 7 bar; t = 10 min; T = 90° C.

At same conditions, it is shown, from the previous table, that all dimethyl cyclopentadienyl fused indolyl titanium amidinate catalysts (CPD13M, CPD14M, CPD4M, CPD5M, CPD9M, CPD10M, CPD8M, CPD7M, CPD11M, CPD12M, CPD6M) exhibit higher number average molecular weight and weight average molecular weight compared to comparative example CE1M while maintaining a high productivity. The table also shows that the cyclopentadienyl fused benzofuranyl titanium amidinate catalysts (CPD2M, CPD23M, CPD1M) have a combined poor productivity and low molecular weight capability.

TABLE 2

EPM 400/200 NL/h; 90° C. 7bar; TiBA/trityl tetrakis(pentafluorophenyl)borate (TBF20)

| Catalyst | Cat dosing | M-cont | C2 | C3 | Mn | Mw | Mw/Mn |
|---|---|---|---|---|---|---|---|
| CE1M | 0.3 | 5.32 | 41.8 | 58.2 | 131 | 284 | 2.2 |
| CPD3M | 0.4 | 3.5 | 24.7 | 75.3 | 74 | 203 | 2.7 |
| CPD2M | 0.2 | 0.94 | 20.8 | 79.2 | 136 | 284 | 2.1 |
| CPD1M | 0.2 | 10.6 | 20.2 | 79.8 | 103 | 390 | 3.8 |
| CPD4M | 0.3 | 4.5 | 31.4 | 69.6 | 211 | 527 | 2.5 |
| CPD5M | 0.1 | 0.8 | 33.9 | 66.1 | 233 | 492 | 2.1 |
| CPD8M | 0.1 | 0.5 | 32 | 68 | 188 | 420 | 2.2 |
| CPD11M | 0.1 | 2.3 | 33.9 | 66.1 | 206 | 517 | 2.5 |
| CPD10M | 0.6 | 6.1 | 34.9 | 65.1 | 335 | 687 | 2.1 |

TABLE 2-continued

EPM 400/200 NL/h; 90° C. 7bar; TiBA/trityl tetrakis(pentafluorophenypborate (TBF20)

| Catalyst | Cat dosing | M-cont | C2 | C3 | Mn | Mw | Mw/Mn |
|---|---|---|---|---|---|---|---|
| CPD12M | 0.3 | 5.0 | 32.1 | 67.9 | 230 | 506 | 2.2 |
| CPD6M | 0.2 | 1.2 | 31.4 | 68.6 | 215 | 482 | 2.2 |
| CPD14M | 0.1 | 1.2 | 41 | 59 | 330 | 679 | 2.1 |
| CPD13M | 0.1 | 1.1 | 43.5 | 56.5 | 289 | 661 | 2.3 |

TiBA = 450 micromoles/l; BHT/Al = 2; TRITYLTETRAKIS(PENTAFLUOROPHENYL) BORATE B/Ti = 2; C3 = 400 Nl/h; C2 = 200 Nl/h; P = 7 bar; t = 10 min; T = 90° C.

At same conditions, it is shown, from the previous table, that all dimethyl cyclopentadienyl fused indolyl titanium amidinate catalysts (CPD13M, CPD14M, CPD4M, CPD5M, CPD10M, CPD8M, CPD11M, CPD12M, CPD6M) exhibit higher number average molecular weight and weight average molecular weight combined with a similar to higher productivity compared to comparative example CE1M. The table also shows that the cyclopentadienyl fused benzofuranyl titanium amidinate catalysts (CPD2M, CPD3M, CPD1M) have a combined poor productivity and low molecular weight capability.

TABLE 3

EPM 250/250 NL/h; 90° C. 7bar; MAO-10T

| Catalyst | Cat dosing | M-cont | C2 | C3 | Mn | Mw | Mw/Mn |
|---|---|---|---|---|---|---|---|
| CE1M | 0.1 | 1.5 | 56.3 | 43.7 | 180 | 438 | 2.1 |
| CPD2M | 0.05 | 0.5 | 38.8 | 61.2 | 184 | 388 | 2.1 |
| CPD1M | 0.2 | 6.4 | 36.4 | 63.6 | 121 | 367 | 3 |
| CPD13M | 0.03 | 0.2 | 57.9 | 42.1 | 418 | 945 | 2.3 |
| CPD4M | 0.1 | 0.6 | 50.5 | 49.5 | 350 | 760 | 2.2 |
| CPD5M | 0.1 | 0.6 | 52.4 | 47.6 | 291 | 647 | 2.2 |
| CPD9M | 0.1 | 0.7 | 48.4 | 51.6 | 364 | 822 | 2.3 |
| CPD10M | 0.07 | 0.4 | 52.2 | 47.8 | 396 | 859 | 2.2 |
| CPD8M | 0.07 | 0.4 | 49.6 | 50.4 | 287 | 642 | 2.2 |
| CPD7M | 0.1 | 0.8 | 51.7 | 48.3 | 227 | 556 | 2.4 |
| CPD11M | 0.05 | 0.4 | 50.8 | 49.2 | 307 | 700 | 2.3 |
| CPD12M | 0.05 | 0.3 | 48.7 | 51.3 | 317 | 635 | 2.0 |
| CPD6M | 0.05 | 0.4 | 47.3 | 52.7 | 442 | 892 | 2.0 |
| CPD14M | 0.03 | 0.3 | 53.7 | 46.3 | 458 | 962 | 2.1 |

MAO-10T = 450 micromoles/l; BHT/Al = 2; C3 = 250 Nl/h; C2 = 250 Nl/h; P = 7 bar; t = 10 min; T = 90° C.

At same conditions, it is shown, from the previous table, that all dimethyl cyclopentadienyl fused indolyl titanium amidinate catalysts (CPD13M, CPD14M, CPD4M, CPD5M, CPD9M, CPD10M, CPD8M, CPD7M, CPD11M, CPD12M, CPD6M) exhibit higher number average molecular weight and weight average molecular weight compared to comparative example CE1M while maintaining a high productivity. The table also shows that the cyclopentadienyl fused benzofuranyl titanium amidinate catalysts (CPD2M, CPD1M) have a combined poor productivity and low molecular weight capability.

TABLE 4

EPDM 400/200 NL/h high ENB; 90° C. 7bar; MAO-10T

| Catalyst | Cat dosing | M-cont | C2 | C3 | ENB | Mn | Mw | Mw/Mn |
|---|---|---|---|---|---|---|---|---|
| CE1M | 0.2 | 2.9 | 37.7 | 55.1 | 5.3 | 145 | 309 | 2.1 |
| CPD3M | 0.2 | 6.84 | 22.5 | 73.8 | 3.7 | 96 | 245 | 2.6 |
| CPD2M | 0.1 | 1.04 | 22.3 | 74.5 | 3.2 | 157 | 336 | 2.1 |
| CPD1M | 0.1 | 12 | 19.6 | 78.3 | 2.1 | 140 | 339 | 2.4 |
| CPD13M | 0.2 | 0.8 | 40 | 56 | 4 | 194 | 407 | 2.1 |
| CPD4M | 0.2 | 0.8 | 31 | 65.3 | 3.7 | 198 | 466 | 2.4 |
| CPD5M | 0.1 | 0.7 | 35.9 | 58.6 | 5.5 | 190 | 463 | 2.4 |
| CPD9M | 0.2 | 1.1 | 31.4 | 65.2 | 3.4 | 227 | 508 | 2.2 |
| CPD10M | 0.1 | 0.7 | 34.3 | 60.2 | 5.5 | 239 | 533 | 2.2 |
| CPD8M | 0.1 | 1.0 | 31.9 | 64.3 | 3.8 | 222 | 481 | 2.2 |
| CPD7M | 0.1 | 1.1 | 33.7 | 60.4 | 5.9 | 187 | 405 | 2.2 |
| CPD11M | 0.1 | 0.7 | 35.5 | 58.6 | 5.9 | 205 | 446 | 2.2 |
| CPD12M | 0.1 | 0.92 | 31.9 | 64.3 | 3.8 | 195 | 431 | 2.2 |
| CPD6M | 0.1 | 0.55 | 31.8 | 64.5 | 3.7 | 206 | 418 | 2.0 |
| CPD14M | 0.1 | 0.52 | 39.6 | 56 | 4.4 | 270 | 553 | 2.1 |

MAO-10T = 450 micromoles/l; BHT/Al = 2; C3 = 400 Nl/h; C2 = 200 Nl/h; 0.35 Nl/h H2; 2.8 ml ENB; P = 7 bar; t = 10 min; T = 90° C.

At same conditions, it is shown, from the previous table, that all dimethyl cyclopentadienyl fused indolyl titanium amidinate catalysts (CPD13M, CPD14M, CPD4M, CPD5M, CPD9M, CPD10M, CPD8M, CPD7M, CPD11M, CPD12M, CPD6M) exhibit higher number average molecular weight and weight average molecular weight combined with a higher ENB incorporation compared to comparative example CE1M. The table also shows that the cyclopentadienyl fused benzofuranyl titanium amidinate catalysts (CPD3M, CPD2M, CPD1M) exhibit a low affinity for ENB.

Further, complex CE1M as described in more detail above is compared with a complex as disclosed in KR 20170046462, which is named CE2M. In more detail, complex CE2M corresponds to chemical formula 1 of KR 20170046462.

The experimental procedures for comparing complexes CE1M and CE2M are as follows.

In Situ Catalyst Formation

Catalysts were prepared in situ by employing a combinatorial approach using either $C_5R_5TiCl_3$ complexes and an equivalent quantity of one of the protio ligands. For the in situ-generated complexes presented, the protio ligand was first deprotonated with one equivalent of MeMgCl (3.0M in THF) in toluene for thirty minutes at room temperature before a toluene solution of $C_5R_5TiCl_3$ (one molar equivalent) was added. Each combination of ligand with metal precursor $C_5R_5TiCl_3$ represents a catalyst component.

The concentrations were adjusted such that the overall concentration of titanium in the final solution was 40 mM. The solutions were then employed in polymerization reactions.

EPDM Co-Polymerizations Using In Situ-Generated Catalysts

The polymerizations with the in situ-generated catalysts were carried out in 48 parallel pressure reactors (PPR48). The PPR reactor cells are fitted with a pre-weighed glass vial insert and a disposable stirring paddle. The reactors are sealed, tested with nitrogen at 130 psi to ensure that leaks not higher than 0.1 psi min$^{-1}$ may occur. The reactor atmosphere is then purged three times with propene at 80 psi, and 3.9 mL of toluene are added (toluene is purified by passing through MBraun SPS mixed bed columns), along with 200 mL of an ENB/MMAO-3A/BHT toluene solution with the following composition: ENB (Sigma Aldrich, used as received, 5% v/v) 34 mM (final reactor concentration), MMAO-3A (AKZO NOBEL) 50 mM and BHT (Sigma Aldrich, used as received) 25 mM. The liquid reactants are injected into each cell through a valve. The reactors are heated at 40° C. and the cells are pressurized with 50 psi of propene (Linde Gas, further purified through Selexorb and BASF catalysts for Oxygen and moisture removal) for 5 minutes with a stirring speed of the paddles of 800 rpm. After pressure stabilization, the reactors are heated at the polymerization temperature (90° C.) and the reactors are then left to equilibrate for 20 minutes. The reactors are then pressurized with ethene until a final pressure of 130 psi is reached. The pre-catalyst and activator (Trityl Tetrakis(pentafluorophenyl)borate (TBF20)) toluene solutions (4 mM) are injected in to the cells preventing contact with a 50 μL nitrogen gap in the dispensation needle. The ratio of B:Ti is set at 2. The pre-catalyst loading is adjusted such that mass transport limitations are not encountered. The polymerization is run at constant temperature and ethene partial pressure for 5 minutes, then quenched with an oxygen/nitrogen mixture (2% Oxygen content v/v) at 50 psi (3.4 bar) overpressure. The reactors are cooled, vented and purged with N2, in order to prevent the glove box pollution from the quenching gas. After purging with inert gas, the reactors are opened and the glass inserts are unloaded from the cells, transferred to the centrifuge/vacuum drying station (Genevac EZ-2 Plus) and the volatiles are removed under reduced pressure overnight. The polymer samples are then weighed on a weighting station unit and the polymer yields are recorded. The polymers were analysed for intrinsic viscosity (IV), Mw/Mn and composition (FT-IR).

Further, the structures of the compared complexes are as follows:

Complex CE1M, which is already described above:

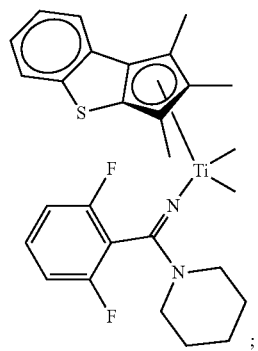

and complex CE2M:

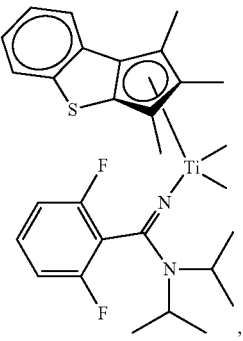

The following results be were achieved as shown in table 5:

TABLE 5

| | | HTE EPDM experiment[a] | | | | | | | |
|---|---|---|---|---|---|---|---|---|---|
| Entry | Code | Cat. prod. (ppm Ti) | Mw (kg/mol) | Mn (kg/mol) | Mz (kg/mol) | Mw/Mn | IV (dL/g) | C2 wt % | C3 wt % | ENB wt % |
| 1 | CE1M | 1.1 | 417 | 190 | 117 | 2.2 | 2.8 | 30.0 | 65.1 | 5.0 |
| 2 | CE2M | 0.8 | 281 | 129 | 84 | 2.2 | 2.2 | 30.0 | 66.0 | 4.0 |

[a]Reaction conditions: 0.002 μmol catalyst, 10 μmol MAO-3A, BHT/Al = 0.5 mol/mol, TBF2/Ti = 2 mol/mol, 185 μmol ENB, 8.9 barg of constant C2 pressure, C3/C2 = 7.37/1.53 bar/bar, t = 5 min, 5 mL reactor, T = 90° C. Numbers shown are averages of 4-5 individual experiments.

Therefore, it can clearly be seen from the previous table that, at same conditions, complex CE1M exhibits higher number average molecular weight and weight average molecular weight combined with complex CE2M. The table also shows that the complex CE1M exhibits good affinity for ENB.

It is thus clearly shown that complex CE1M is superior over complex CE2M with regard to molecular weight and is slightly better in ENB incorporation.

Regarding a comparison of the complexes of the present invention with the complexes of the prior art according to KR 20170046462 with regard to ENB incorporation and molecular weight, it can thus be said that as the complexes of the present invention are superior over complex CE1M with regard to molecular weight and maintain ENB incorporation and as complex CE1M is superior over complex CE2M, which refers to KR 20170046462, the complexes of the present invention are superior over the complexes of the prior art according to KR 20170046462.

The invention claimed is:

1. A metal complex of the formula (1)

$$InCyLMZ_p \qquad (1),$$

wherein

M is a group 4 metal,

Z is an anionic ligand, p is number of 1 to 2,

InCy is an indole fused cyclopentadienyl-type ligand of the formula (2)

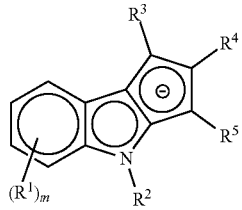

(2)

wherein
$R^1$ each independently is a $C_1$-$C_4$-alkyl,
m is a number of 0 to 4,
$R^2$ is a $C_1$-$C_{10}$-alkyl, $C_5$-$C_{10}$-cycloalkyl, or a $C_6$-$C_{10}$-aryl unsubstituted or substituted with $C_1$-$C_{10}$-alkyl or C1-C4-dialkyl amino,
$R^3$, $R^4$ and $R^5$ each is independently selected from the group consisting of hydrogen, $C_1$-$C_4$-alkyl, $C_6$-$C_{10}$-aryl unsubstituted or substituted with $C_1$-$C_4$-alkyl, halide, or both of $C_1$-$C_4$-alkyl and halide and,
L is an amidinate ligand of the formula (3a)

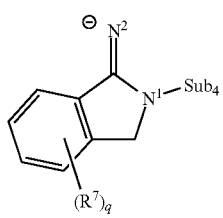

(3a)

wherein the amidine-containing ligand (3a) is bonded to the metal M via the imine nitrogen atom $N^2$,
wherein $R^7$ is independently selected from the group consisting of $C_1$-$C_4$-alkyl and halide and q is a number of 0 to 4,
$Sub_4$ is a cyclic or linear aliphatic or aromatic substituent.

2. The metal complex according to claim 1, wherein M is titanium.

3. The metal complex according to claim 1, wherein Z is independently selected from the group consisting of a halogen atom, a $C_{1-10}$ alkyl group, a $C_{7-20}$ aralkyl group, a $C_{6-20}$ aryl group or a $C_{1-20}$ hydrocarbon-substituted amino group.

4. The metal complex according to claim 1, wherein
M is Ti,
Z is independently selected from the group consisting of chloride, and $C_1$-$C_4$-alkyl, and
p is 2.

5. The metal complex according to claim 1, wherein InCy is an indole fused cyclopentadienyl ligand of the formula (2), m is 0, $R^2$ is a $C_1$-$C_4$-alkyl unsubstituted or $C_1$-$C_4$-alkyl substituted phenyl.

6. A process for the manufacturing of a metal complex according to claim 1, wherein a metal complex of the formula (4)

$$InCyMZ_{p+1} \quad (4)$$

is reacted with an amidine of the formula LH (3H) or its hydrohalogen acid salt LH.HX wherein X is a halogen.

7. A catalyst system comprising:
a) a metal complex of the formula (1)

$$InCyLMZ_p \quad (1),$$

b) an activator and
c) optionally a scavenger,
wherein in formula (1)
M is a group 4 metal,
Z is an anionic ligand,
p is number of 1 to 2,
InCy is an indole fused cyclopentadienyl-type ligand of the formula (2)

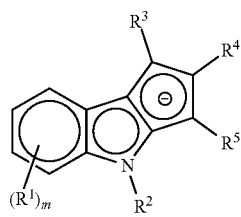

(2)

wherein
$R^1$ each independently is a $C_1$-$C_4$-alkyl,
m is a number of 0 to 4,
$R^2$ is a $C_1$-$C_{10}$-alkyl, $C_5$-$C_{10}$-cycloalkyl, or a $C_6$-$C_{10}$-aryl unsubstituted or substituted with $C_1$-$C_{10}$-alkyl or $C_1$-$C_4$-dialkyl amino,
$R^3$, $R^4$ and $R^5$ each is independently selected from the group consisting of hydrogen, $C_1$-$C_4$-alkyl, $C_6$-$C_{10}$-aryl unsubstituted or substituted with $C_1$-$C_4$-alkyl, halide, or both of $C_1$-$C_4$-alkyl and halide and,
L is an amidinate ligand of the formula (3a)

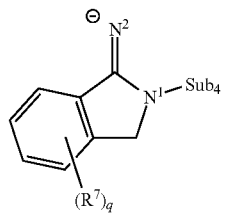

(3a)

wherein the amidine-containing ligand (3a) is bonded to the metal M via the imine nitrogen atom $N^2$,
wherein $R^7$ is independently selected from the group consisting of $C_1$-$C_4$-alkyl and halide and q is a number of 0 to 4,
$Sub_4$ is a cyclic or linear aliphatic or aromatic substituent.

8. The catalyst system according to claim 7, wherein the scavenger c) is hydrocarbyl of a metal or metalloid of group 1-13 or its reaction products with at least one sterically hindered compound containing a group 15 or 16 atom.

9. The catalyst system according to claim 7, wherein the activator b) is a borane, a borate or an organoaluminum compound (E).

10. A process for the preparation of a polymer by polymerizing at least one olefinic monomer comprising contacting said monomer with a metal complex according to formula (1):

$$InCyLMZ_p \quad (1),$$

wherein

M is a group 4 metal,

Z is an anionic ligand, p is number of 1 to 2,

InCy is an indole fused cyclopentadienyl-type ligand of the formula (2)

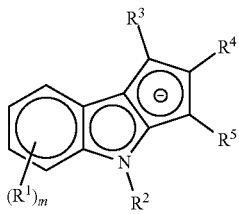

(2)

wherein $R_1$ each independently is a $C_1$-$C_4$-alkyl, m is a number of 0 to 4, $R_2$ is a $C_1$-$C_{10}$-alkyl, $C_5$-$C_{10}$-cycloalkyl, or a $C_6$-$C_{10}$-aryl unsubstituted or substituted with $C_1$-$C_{10}$-alkyl or $C_1$-$C_4$-dialkyl amino, $R_3$, $R_4$ and $R_5$ each is independently selected from the group of hydrogen, $C_1$-$C_4$-alkyl, $C_6$-$C_{10}$-aryl unsubstituted or substituted with $C_1$-$C_4$-alkyl, halide or both of $C_1$-$C_4$-alkyl and halide and, L is an amidinate ligand of the formula (3a)

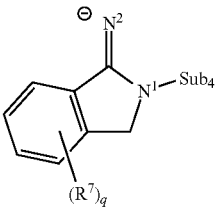

(3a)

wherein the amidine-containing ligand (3a) is bonded to the metal M via the imine nitrogen atom $N^2$, wherein $R^7$ is independently selected from the group consisting of $C_1$-$C_4$-alkyl and halide and q is a number of 0 to 4, $Sub_4$ is a cyclic or linear aliphatic or aromatic substituent.

11. The process according to claim 10, wherein ethylene and at least a $C_3$-$C_{12}$-α-olefin is used as olefinic monomers.

12. The process according to claim 10, wherein ethylene, at least one $C_{3-12}$ alpha olefin and at least one non-conjugated diene is used as olefinic monomers.

* * * * *